(12) United States Patent
Li et al.

(10) Patent No.: US 11,122,620 B2
(45) Date of Patent: Sep. 14, 2021

(54) USER EQUIPMENT AND DATA TRANSMISSION METHOD THEREOF

(71) Applicant: Samsung Electronics Co., Ltd., Gyeonggi-do (KR)

(72) Inventors: Ying yang Li, Beijing (CN); Yi Wang, Beijing (CN); Shichang Zhang, Beijing (CN)

(73) Assignee: Samsung Electronics Co., Ltd

( * ) Notice: Subject to any disclaimer, the term of this patent is extended or adjusted under 35 U.S.C. 154(b) by 51 days.

(21) Appl. No.: 16/483,676

(22) PCT Filed: May 2, 2018

(86) PCT No.: PCT/KR2018/005077
§ 371 (c)(1),
(2) Date: Aug. 5, 2019

(87) PCT Pub. No.: WO2018/203654
PCT Pub. Date: Nov. 8, 2018

(65) Prior Publication Data
US 2020/0022181 A1    Jan. 16, 2020

(30) Foreign Application Priority Data

May 5, 2017 (CN) .......................... 201710316544.2

(51) Int. Cl.
*H04W 56/00* (2009.01)
*H04W 74/08* (2009.01)
(Continued)

(52) U.S. Cl.
CPC ...... *H04W 74/0808* (2013.01); *H04B 17/318* (2015.01); *H04W 24/10* (2013.01); *H04W 72/0446* (2013.01); *H04W 74/02* (2013.01)

(58) Field of Classification Search
CPC ............. H04W 74/0808; H04W 24/10; H04W 72/0446; H04W 74/02; H04B 17/318
(Continued)

(56) References Cited

U.S. PATENT DOCUMENTS 10,129,898 B2    11/2018 Seo et al.
2017/0013469 A1*  1/2017 Larsson ............ H04W 74/0808
(Continued)

FOREIGN PATENT DOCUMENTS

KR    1020090043696    5/2009
WO    WO 2015/194916   12/2015
(Continued)

OTHER PUBLICATIONS

PCT/ISA/210 Search Report issued on PCT/KR2018/005077, pp. 3.
PCT/ISA/237 Written Opinion issued on PCT/KR2018/005077, pp. 4.
ASUSTeK, 3GPP TSG RAN WG1 Meeting #76bis, R1-141576, Shenzhen, China, Mar. 22, 2014, "D2D communication resource scheduling", pp. 5.
(Continued)

*Primary Examiner* — Sai Ming Chan
(74) *Attorney, Agent, or Firm* — The Farrell Law Firm, P.C.

(57) ABSTRACT

An embodiment of the present disclosure provides a method performed at a UE for data transmission. The method includes: detecting a scheduling assignment(SA) for other UEs within a sensing window which includes a plurality of time units(TUs); selecting, based on the detected SA, a set of resources for data transmission; determining, before transmitting data on a resource in the selected set of resources, whether the resource is occupied; and transmitting the data on the resource in the selected set of resources if it is determined that the resource is not occupied. An embodiment of the present disclosure also provides a corresponding UE.

14 Claims, 5 Drawing Sheets

(51) Int. Cl.
*H04B 17/318* (2015.01)
*H04W 24/10* (2009.01)
*H04W 72/04* (2009.01)
*H04W 74/02* (2009.01)

(58) Field of Classification Search
USPC .......................................................... 370/329
See application file for complete search history.

(56) References Cited

U.S. PATENT DOCUMENTS

| 2017/0019822 | A1  | 1/2017  | Zhao et al. | |
| 2017/0086216 | A1* | 3/2017  | Patil | H04W 72/02 |
| 2017/0142746 | A1* | 5/2017  | Koorapaty | H04W 16/14 |
| 2017/0289869 | A1* | 10/2017 | Nogami | H04W 36/08 |
| 2017/0332207 | A1* | 11/2017 | Sheng | H04W 4/027 |
| 2019/0342893 | A1* | 11/2019 | Zhao | H04W 72/10 |

FOREIGN PATENT DOCUMENTS

| WO | WO 2016/021227 | 2/2016 |
| WO | WO 2016/120940 | 8/2016 |
| WO | WO 2017/052757 | 3/2017 |

OTHER PUBLICATIONS

Samsung, "Sensing Procedure for UE Autonomous Resource Selection", R1-164757, 3GPP TSG RAN WG1 Meeting #85, May 23-27, 2016, 6 pages.
LG Electronics, "Discussion on Details of Sensing Operation for PC5 Based V2V", R1-164510, 3GPP TSG RAN WG1 Meeting #85, May 23-27, 2016, 5 pages.
European Search Report dated Feb. 21, 2020 issued in counterpart application No. 18794889.8-1212, 12 pages.

* cited by examiner

[Fig. 1]
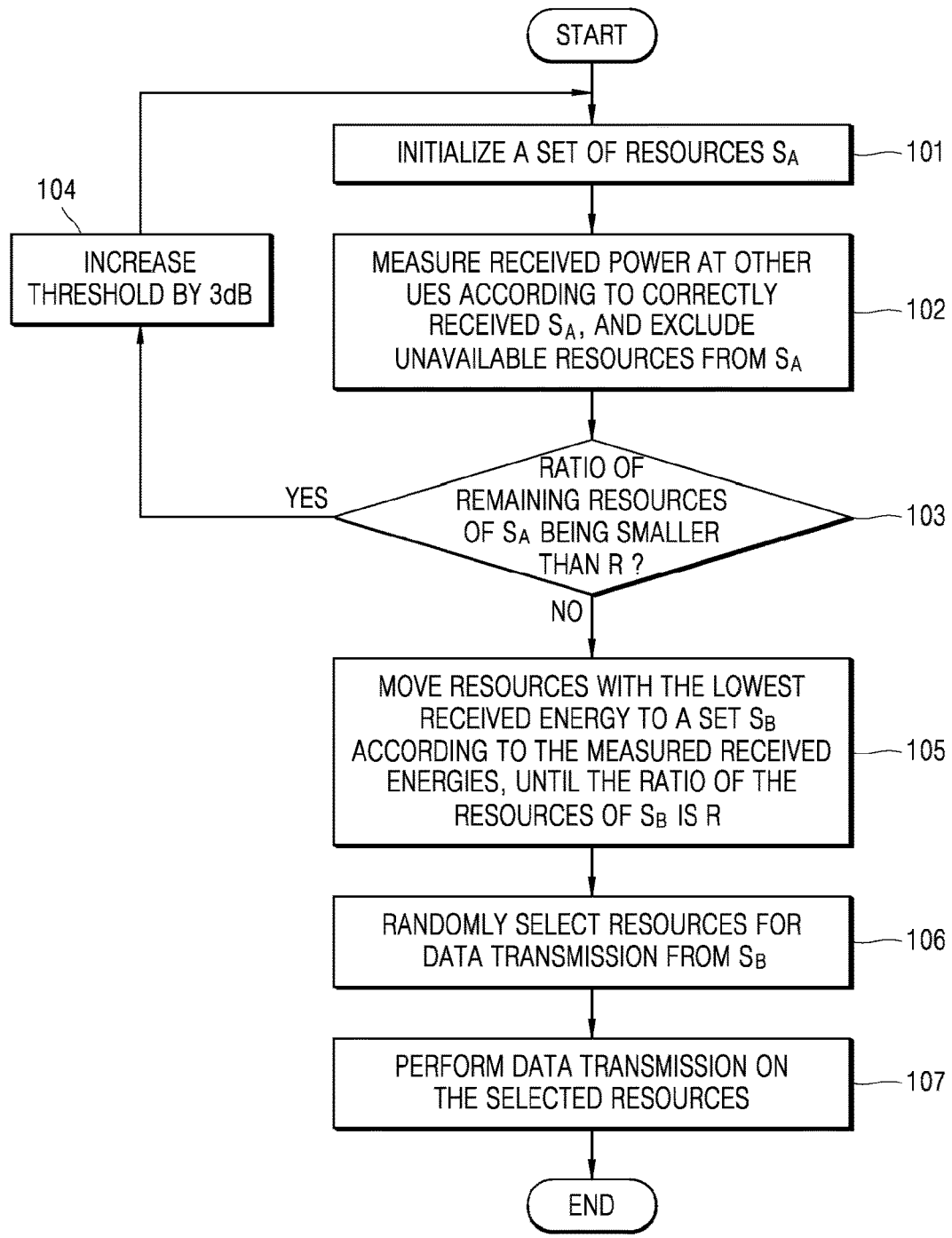
[Fig. 2]
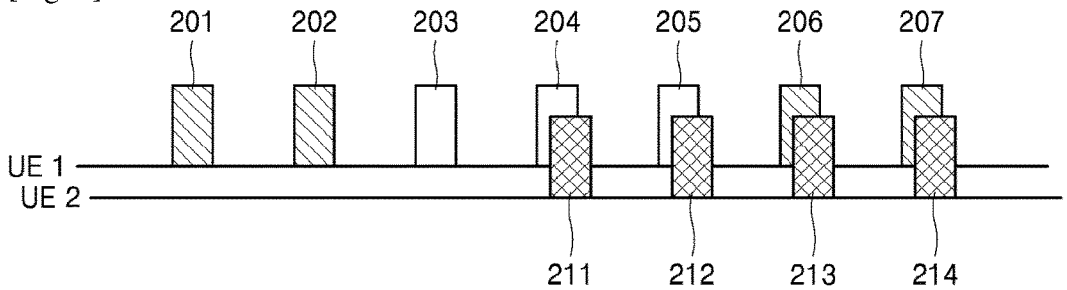

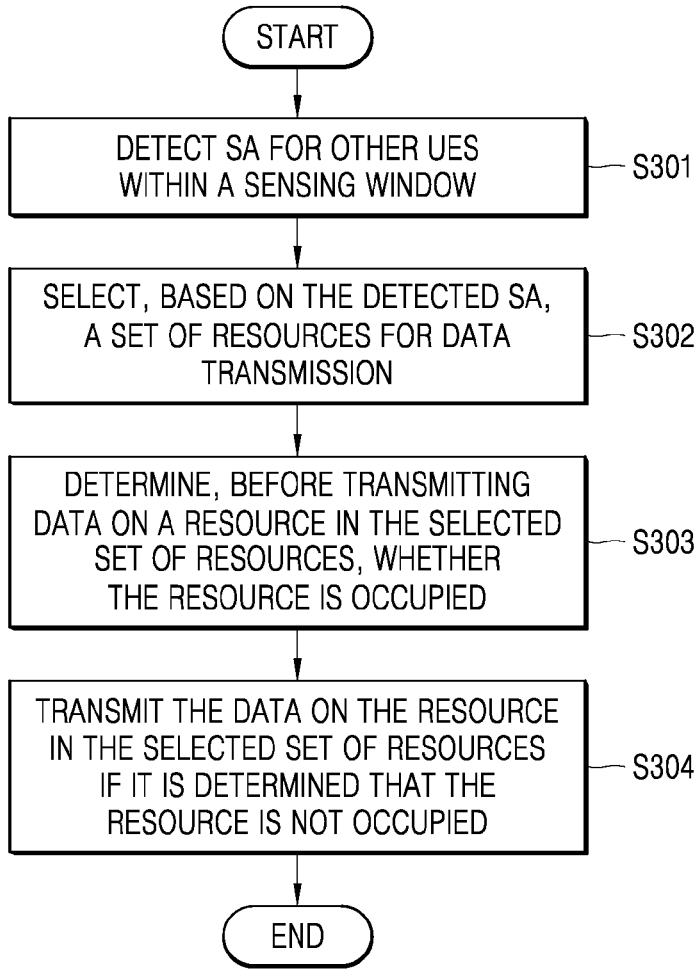
[Fig. 3]
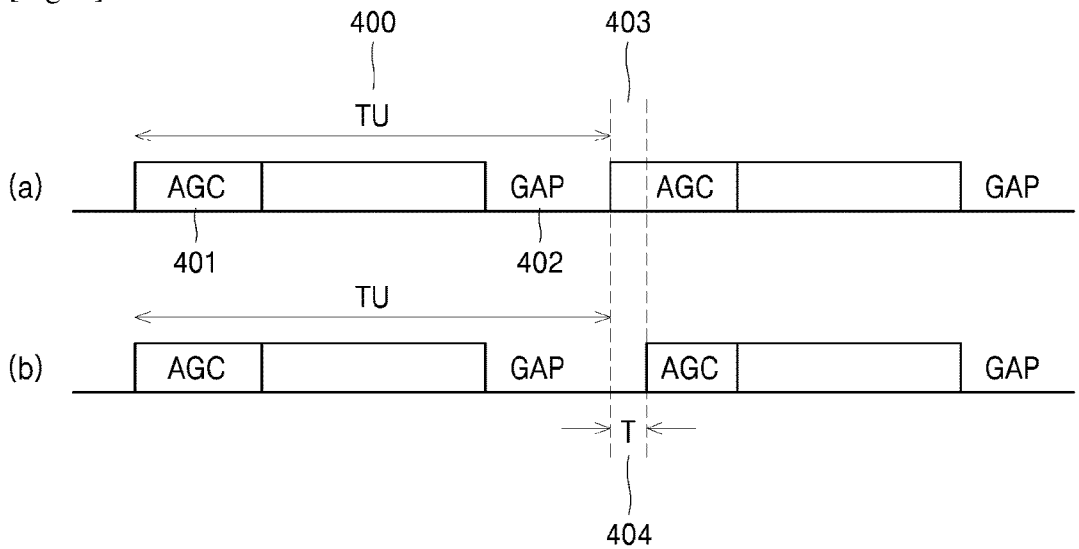
[Fig. 4]

[Fig. 5]
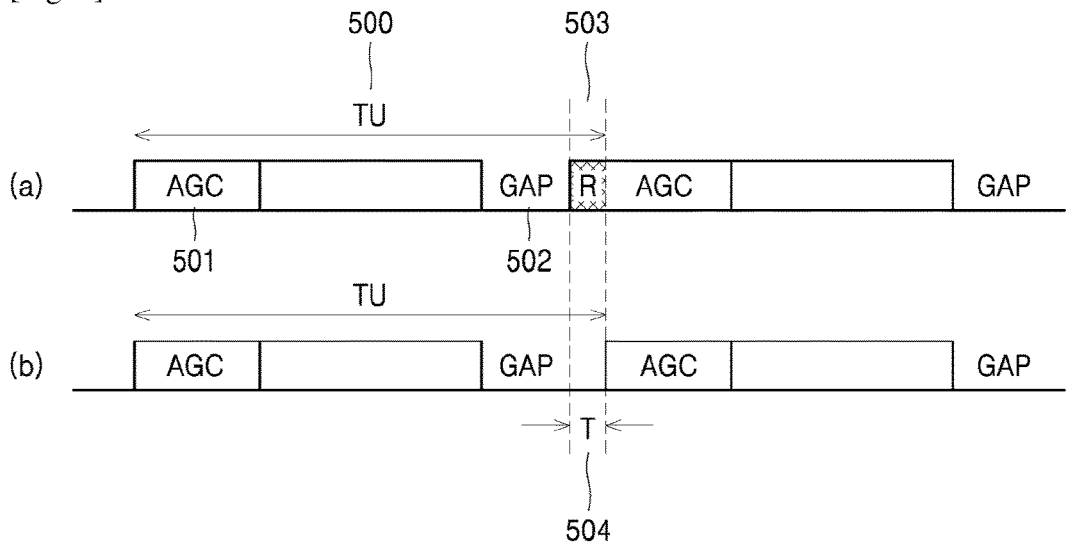
[Fig. 6]
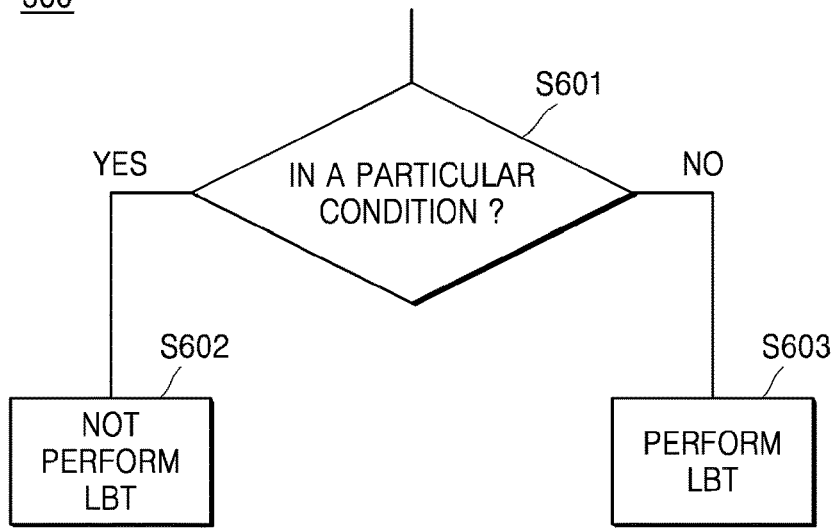
[Fig. 7]
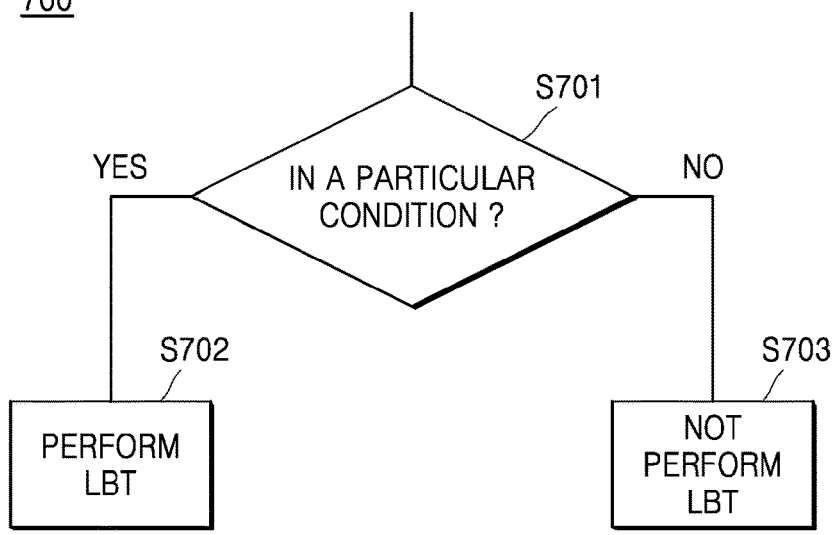

[Fig. 8]
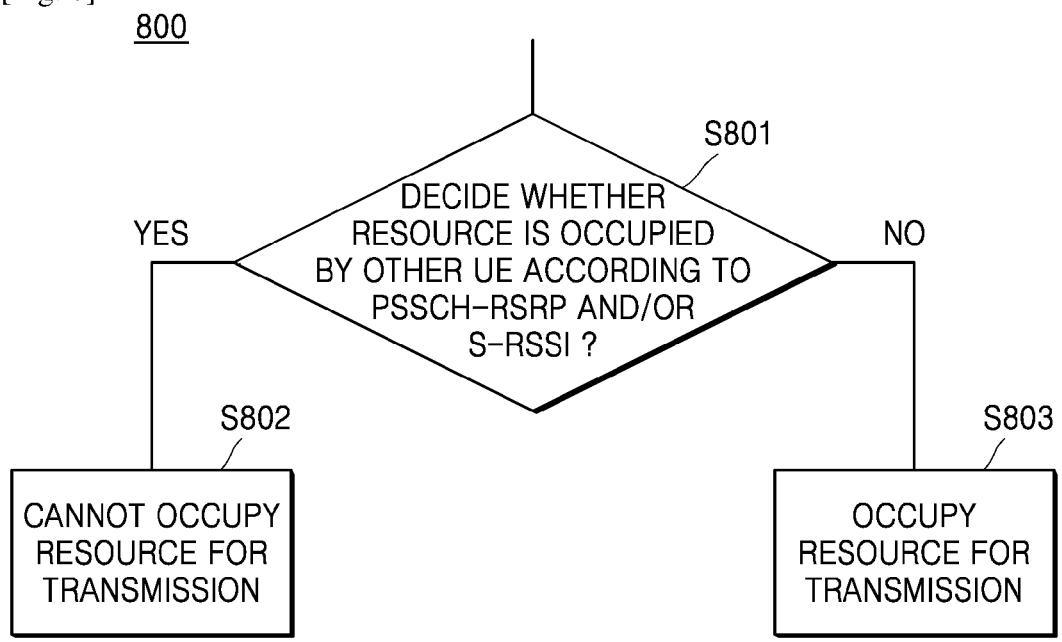
[Fig. 9]
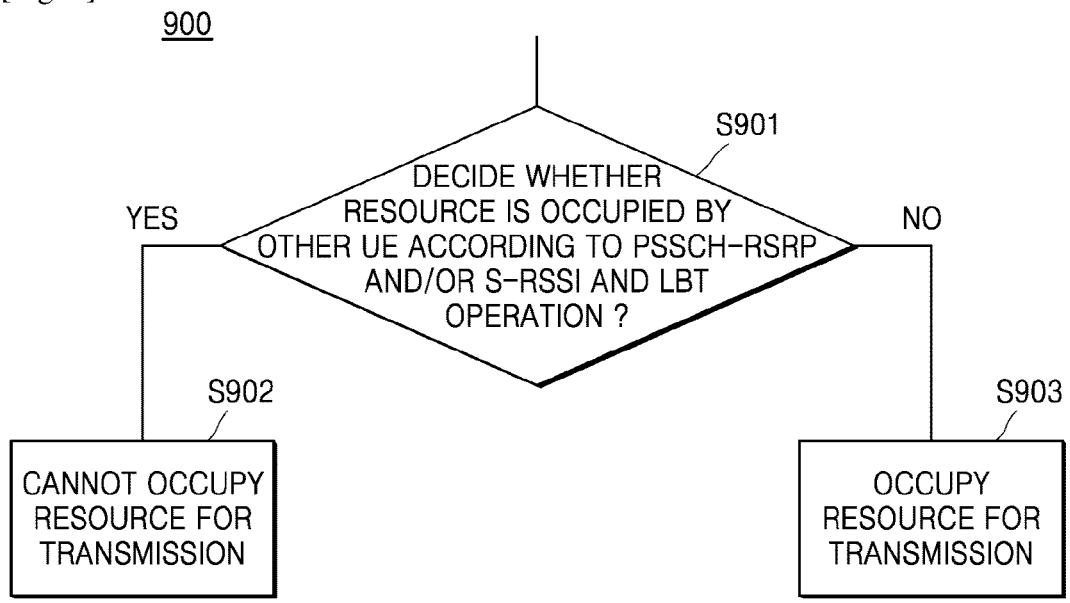

[Fig. 10]
UE 1000
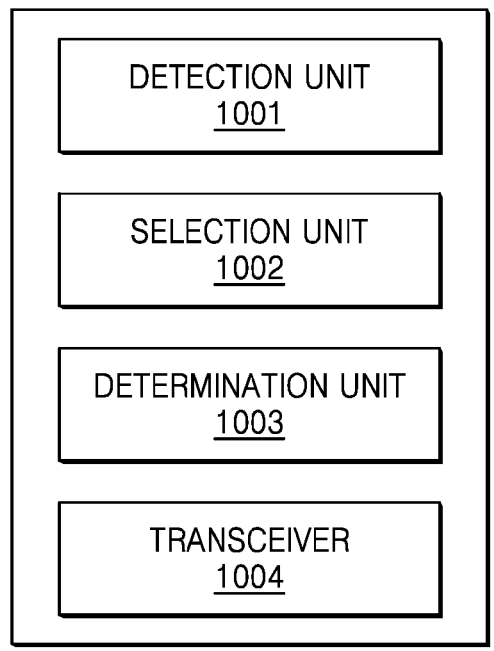
[Fig. 11]
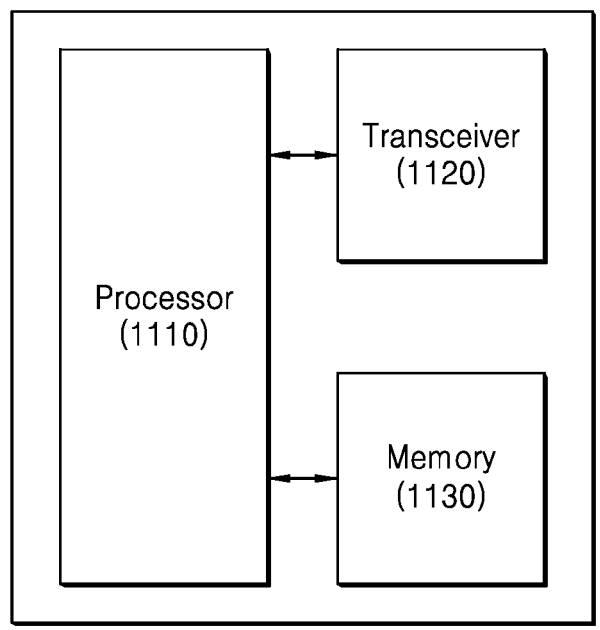

USER EQUIPMENT AND DATA TRANSMISSION METHOD THEREOF

PRIORITY

This application is a National Phase Entry of PCT International Application No. PCT/KR2018/005077 which was filed on May 2, 2018, and claims priority to Chinese Patent Application No. 201710316544.2, which was filed on May 5, 2017, the content of each of which is incorporated herein by reference.

TECHNICAL FIELD

The present disclosure relates to wireless communication technology, in particular to a method performed at a UE (user equipment) for data transmission and a corresponding UE.

BACKGROUND ART

To meet the demand for wireless data traffic having increased since deployment of 4th generation (4G) communication systems, efforts have been made to develop an improved 5th generation (5G) or pre-5G communication system. The 5G or pre-5G communication system is also called a 'beyond 4G network' or a 'post long term evolution (LTE) system'. The 5G communication system is considered to be implemented in higher frequency (mmWave) bands, e.g., 60 GHz bands, so as to accomplish higher data rates. To decrease propagation loss of the radio waves and increase the transmission distance, beamforming, massive multiple-input multiple-output (MIMO), full dimensional MIMO (FD-MIMO), array antenna, analog beamforming, and large scale antenna techniques are discussed with respect to 5G communication systems. In addition, in 5G communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like. In the 5G system, hybrid frequency shift keying (FSK) and Feher's quadrature amplitude modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the Internet of things (IoT) where distributed entities, such as things, exchange and process information without human intervention. The Internet of everything (IoE), which is a combination of the IoT technology and the big data processing technology through connection with a cloud server, has emerged. As technology elements, such as "sensing technology", "wired/wireless communication and network infrastructure", "service interface technology", and "security technology" have been demanded for IoT implementation, a sensor network, a machine-to-machine (M2M) communication, machine type communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing information technology (IT) and various industrial applications.

In line with this, various attempts have been made to apply 5G communication systems to IoT networks. For example, technologies such as a sensor network, MTC, and M2M communication may be implemented by beamforming, MIMO, and array antennas. Application of a cloud RAN as the above-described big data processing technology may also be considered to be as an example of convergence between the 5G technology and the IoT technology.

As described above, various services can be provided according to the development of a wireless communication system, and thus a method for easily providing such services is required.

DISCLOSURE OF INVENTION

Technical Problem

A data transmission method for further reducing collisions between UEs in resource selection and data transmission of the UEs is an urgent problem to be solved.

Solution to Problem

The embodiments of the present disclosure provides a method for data transmission, comprising: detecting a scheduling assignment(SA) for other UEs within a sensing window which includes a plurality of time units(TUs), selecting, based on the detected SA, a set of resources for data transmission, determining, before transmitting data on a resource in the selected set of resources, whether the resource is occupied and transmitting the data on the resource in the selected set of resources if it is determined that the resource is not occupied.

Advantageous Effects of Invention

According to the embodiments of the present disclosure, interference due to the collisions of the UEs may be avoided as much as possible, especially when the UE is not transmitting on one or more reserved resources, and collision of UEs may be avoided so as to improve reliability of data transmission.

BRIEF DESCRIPTION OF DRAWINGS

FIG. 1 shows a schematic flowchart of a method for resource selection based on detection in prior art.

FIG. 2 shows a schematic diagram of resource conflicts between a plurality of UEs.

FIG. 3 shows a schematic flowchart of a method for data transmission at a UE according to an exemplary embodiment of the present disclosure.

FIG. 4 shows a schematic structure diagram of a TU according to an exemplary embodiment of the present disclosure.

FIG. 5 shows a schematic structure diagram of a TU according to another exemplary embodiment of the present disclosure FIG. 6 shows a schematic flowchart of a method of determining whether LBT needs to be performed according to an embodiment of the present disclosure.

FIG. 7 shows a schematic flowchart of a method of determining whether LBT needs to be performed according to another embodiment of the present disclosure.

FIG. 8 shows a schematic flowchart of a method of determining whether a resource is occupied according to an embodiment of the present disclosure.

FIG. 9 shows a schematic flowchart of a method of determining whether a resource is occupied according to another embodiment of the present disclosure.

FIG. 10 is a schematic structure diagram of a UE according to an exemplary embodiment of the present disclosure.

FIG. 11 is a schematic structure diagram of a UE according to another exemplary embodiment of the present disclosure.

BEST MODE FOR CARRYING OUT THE INVENTION

Embodiments of the present disclosure provide a method and a UE for data transmission, providing a mechanism of further reducing collisions between UEs in resource selection and data transmission of the UEs.

For purposes as described above, the embodiments of the present disclosure proposes technical solutions as follows.

According to an aspect of the present disclosure, a method performed at a UE is provided for data transmission is provided. The method includes:

detecting an SA for other UEs within a sensing window which includes a plurality of time units 'TUs';

selecting, based on the detected SA, a set of resources for data transmission;

determining, before transmitting data on a resource in the selected set of resources, whether the resource is occupied; and transmitting the data on the resource in the selected set of resources if it is determined that the resource is not occupied.

In an exemplary embodiment, the operation of determining whether the resource is occupied comprises:

determining whether a Listen-Before-Talk 'LBT' mechanism needs to be performed within a predetermined time period T; and determining that the resource is not occupied, if it is determined that the LBT mechanism does not need to be performed.

In an exemplary embodiment, the predetermined time period T is obtained from: a time period having a length of T from a beginning of a TU; or a time period having a length of T in which a padding signal is transmitted before a TU.

In an exemplary embodiment, the operation of determining whether the LBT mechanism needs to be performed within the predetermined time period T comprises at least:

1) determining that the LBT mechanism does not need to be performed for data transmission on a resource $R_{k,o}$;

2) determining that the LBT mechanism does not need to be performed for data transmission on a resource $R_{k,d}$, if the UE has performed data transmission on d consecutive resources $R_{k,c}$ before the resource $R_{k,d}$, where c<d<C;

3) determining that the LBT mechanism does not need to be performed for data transmission on the resource $R_{k,d}$, if the UE has performed data transmission on D1 consecutive resources $R_{k,c}$ before the resource $R_{k,d}$, where d−D1≤c<d and D1≤d<C;

4) determining that the LBT mechanism does not need to be performed for data transmission on the resource $R_{k,d}$, if the UE has performed data transmission on min(D2, d) consecutive resources $R_{k,c}$ before the resource $R_{k,d}$, where max(d−D2,0)≤c<d<C;

5) determining that the LBT mechanism does not need to be performed for data transmission on the resource $R_{k,d}$ if a number of resources $R_{k,c}$ among D3 consecutive resources $R_{k,c}$ before the resource $R_{k,d}$, on which the UE performs data transmission is no less than E1, where d−D3≤c<d and D3≤d<C;

6) determining that the LBT mechanism does not need to be performed for data transmission on the resource $R_{k,d}$, if a number of resources $R_{k,c}$ among min(D4, d) consecutive resources $R_{k,c}$ before the resource $R_{k,d}$, on which the UE performs data transmission is no less than E1, where max (d−D4,0)≤c<d<C;

7) determining that the LBT mechanism does not need to be performed, if the UE only performs a single transmission on the selected set of resources, where $R_{k,c}$ represents the resource in the selected set of resources, k−0, 1, ..., K−1, c=0, 1, ..., C−1, K is a number of times one piece of data is transmitted in a period, C is a number of periods for reserving the resource, and D1, D2, D3, D4 and E1 are threshold values.

In an exemplary embodiment, the operation of determining whether the LBT mechanism needs to be performed within the predetermined time period T comprises at least:

1) determining that the LBT mechanism needs to be performed for data transmission on a resource $R_{k,o}$;

2) determining that the LBT mechanism needs to be performed for data transmission on first D5 consecutive resources $R_{k,c}$ where c<D5;

3) determining that the LBT mechanism needs to be performed for data transmission on the resource $R_{k,d}$, if the UE does not perform data transmission on at least one of D6 consecutive resources $R_{k,c}$ before the resource $R_{k,d}$, where d−D6≤c<d and D6≤d<C;

4) determining that the LBT mechanism needs to be performed for data transmission on the resource $R_{k,d}$, if the UE does not perform data transmission on at least one of min(D7, d) consecutive resources $R_{k,c}$ before the resource $R_{k,d}$, where max(d−D7,0)≤c<d<C;

5) determining that the LBT mechanism needs to be performed for data transmission on the resource $R_{k,d}$, if a number of resources $R_{k,c}$ among D8 consecutive resources $R_{k,c}$ before the resource $R_{k,d}$, on which the UE does not perform data transmission is no less than 1 and a number of resources $R_{k,c}$, among d consecutive resources $R_{k,c}$ before the resource $R_{k,d}$, on which the UE does not perform data transmission is no less than E2, where d−D8≤c<d and D8≤d<C;

6) determining that the LBT mechanism needs to be performed for data transmission on the resource $R_{k,d}$, if a number of resources $R_{k,c}$ among min(D9, d) consecutive resources $R_{k,c}$ before the resource $R_{k,d}$, on which the UE does not perform data transmission is no less than 1 and a number of resources $R_{k,c}$, among d consecutive resources $R_{k,c}$ before the resource $R_{k,d}$, on which the UE does not perform data transmission is no less than E3, where max (d−D9,0)≤c<d<C;

7) determining that the LBT mechanism needs to be performed for data transmission on the resource $R_{k,d}$, if a number of resources $R_{k,c}$, among D10 consecutive resources $R_{k,c}$ before the resource $R_{k,d}$, on which the UE does not perform data transmission is no less than E4, where d−D10≤c<d and D10≤d<C;

8) determining that the LBT mechanism needs to be performed for data transmission on the resource $R_{k,d}$, if a number of resources $R_{k,c}$, among min(D11, d) consecutive resources $R_{k,c}$ before the resource $R_{k,d}$, on which the UE does not perform data transmission is no less than E5, where max(d−D11,0)≤c<d<C;

9) determining that the LBT mechanism needs to be performed, if the UE only performs a single transmission on the selected set of resources, where $R_{k,c}$ represents the resource in the selected set of resources, k=0, 1, . . . , K−1, c=0, 1, . . . , C−1, K is a number of times one piece of data is transmitted in a period, C is a number of periods for reserving the resource, and D5, D6, D7, D8, D9, D10, D11 and E2, E3, E4, E5 are threshold values.

In an exemplary embodiment, the method further comprises:

determining that one of the selected resources is not occupied in a case where a channel energy does not exceed an energy threshold $X_{Thresh}$, if it is determined that the LBT mechanism needs to be performed, wherein the energy thresholds $X_{Thresh}$ used by the LBT mechanism are identical or different for different performing conditions.

In an exemplary embodiment, determining whether the resource is occupied comprises:

deciding, if the UE does not perform data transmission on one of the selected set of resources, whether a resource subsequent to the one resource in the selected set of resources is occupied based on the detected SA, a received power and a received energy on the resource.

In an exemplary embodiment, the operation of determining whether the resource is occupied comprises:

determining, if the UE does not perform data transmission on one of the selected set of resources, whether a resource subsequent to the one resource in the selected set of resources is occupied based on the detected SA, a received power and a received energy on the resource only in a case where a number of resources, among the selected set of resources, on which the UE does not perform data transmission exceeds a predetermined threshold NR1, or a number of consecutive resources, among the selected set of resources, on which the UE does not perform data transmission exceeds a predetermined threshold NR2, where NR1 and NR2 are threshold values.

In an exemplary embodiment, a threshold of the received power for determining whether the resource subsequent to the one resource in the selected set of resources is occupied is different from a threshold of a received power for performing resource selection; and when the received energy exceeds its threshold, it is determined that the resource subsequent to the resource in the selected set of resources is occupied.

In an exemplary embodiment, the method further comprises:

determining, if the UE does not perform data transmission on one of the selected set of resources, whether the resource subsequent to the one resource in the selected set of resources is occupied, in conjunction with the LBT operation and based on the detected SA, the received power and the received energy.

According to another aspect of the present disclosure, a UE is provided, comprising:

a detection unit configured to detect an SA for other UEs within a sensing window which includes a plurality of TUs SA, measure a received power of a data channel scheduled by the SA, and detect a received energy of each sub-channel of each TU;

a selection unit configured to select, based on the detected SA, the received power and the received energy, a set of resources for data transmission;

a determination unit configured to determine, before transmitting data on a resource in the selected set of resources, whether the resource is occupied; and a transceiver configured to transmit the data on the resource in the selected set of resources if the determination unit determines that the resource is not occupied.

In an exemplary embodiment, the determination unit is configured to determine whether the resource is occupied by:

determining whether a LBT mechanism needs to be performed within a predetermined time period T; and determining that the resource is not occupied, if it is determined that the LBT mechanism does not need to be performed.

In an exemplary embodiment, the predetermined time period T is obtained from: a time period having a length of T from a beginning of a TU; or a time period having a length of T in which a padding signal is transmitted before a TU.

In an exemplary embodiment, the determination unit is configured to determine whether the LBT mechanism needs to be performed within the predetermined time period T by at least:

1) determining that the LBT mechanism does not need to be performed for data transmission on a resource $R_{k,o}$;

2) determining that the LBT mechanism does not need to be performed for data transmission on a resource $R_{k,d}$, if the UE has performed data transmission on d consecutive resources before the resource $R_{k,d}$, where where c<d<C;

3) determining that the LBT mechanism does not need to be performed for data transmission on the resource $R_{k,d}$, if the UE has performed data transmission on D1 consecutive resources $R_{k,d}$, before the resource $R_{k,d}$, where d−D1≤c<d and D1≤d<C;

4) determining that the LBT mechanism does not need to be performed for data transmission on the resource $R_{k,d}$, if the UE has performed data transmission on min(D2, d) consecutive resources $R_{k,c}$ before the resource $R_{k,d}$, where max(d−D2,0)≤c<d<C;

5) determining that the LBT mechanism does not need to be performed for data transmission on the resource $R_{k,d}$, if a number of resources $R_{k,c}$, among D3 consecutive resources $R_{k,c}$, before the resource $R_{k,d}$, on which the UE performs data transmission is no less than E1, where d−D3≤c<d and D3≤d<C;

6) determining that the LBT mechanism does not need to be performed for data transmission on the resource if a number of resources $R_{k,d}$, among min(D4, d) consecutive resources $R_{k,c}$ before the resource $R_{k,d}$, on which the UE performs data transmission is no less than E1, where max(d−D4, 0)≤c<d<C;

7) determining that the LBT mechanism does not need to be performed, if the UE only performs a single transmission on the selected set of resources, where $R_{k,c}$ represents the resource in the selected set of resources, k=0, 1, . . . , K−1, c=0, 1, . . . , C−1, K is a number of times one piece of data is transmitted in a period, C is a number of periods for reserving the resource, and D1, D2, D3, D4 and E1 are threshold values.

In an exemplary embodiment, the determination unit is configured to determine whether the LBT mechanism needs to be performed within the predetermined time period T by at least:

1) determining that the LBT mechanism needs to be performed for data transmission on a resource $R_{k,o}$;

2) determining that the LBT mechanism needs to be performed for data transmission on first D5 consecutive resources $R_{k,c}$ where c<D5;

3) determining that the LBT mechanism needs to be performed for data transmission on the resource $R_{k,d}$, if the UE does not perform data transmission on at least one of D6 consecutive resources $R_{k,c}$ before the resource $R_{k,d}$, where d−D6≤c<d and D6≤d<C;

4) determining that the LBT mechanism needs to be performed for data transmission on the resource $R_{k,d}$, if the UE does not perform data transmission on at least one of min(D7, d) consecutive resources $R_{k,c}$ before the resource $R_{k,d}$, where max(d−D7, 0)≤c<d<C;

5) determining that the LBT mechanism needs to be performed for data transmission on the resource $R_{k,d}$, if a number of resources $R_{k,c}$, among D8 consecutive resources $R_{k,c}$ before the resource $R_{k,d}$, on which the UE does not perform data transmission is no less than 1 and a number of resources $R_{k,c}$, among d consecutive resources $R_{k,c}$ before the resource $R_{k,d}$, on which the UE does not perform data transmission is no less than E2, where d−D8≤c<d and D8≤d<C;

6) determining that the LBT mechanism needs to be performed for data transmission on the resource $R_{k,d}$, if a number of resources $R_{k,c}$, among min(D9, d) consecutive resources $R_{k,c}$ before the resource $R_{k,d}$, on which the UE does not perform data transmission is no less than 1 and a number of resources $R_{k,c}$, among d consecutive resources $R_{k,c}$ before the resource $R_{k,d}$, on which the UE does not perform data transmission is no less than E3, where max (d−D9, 0)≤c<d<C;

7) determining that the LBT mechanism needs to be performed for data transmission on the resource $R_{k,d}$, if a number of resources $R_{k,c}$, among D10 consecutive resources $R_{k,c}$ before the resource $R_{k,d}$, on which the UE does not perform data transmission is no less than E4, where d−D10≤c<d and D10≤d<C;

8) determining that the LBT mechanism needs to be performed for data transmission on the resource $R_{k,d}$, if a number of resources $R_{k,c}$, among min(D11, d) consecutive resources $R_{k,c}$ before the resource $R_{k,d}$, on which the UE does not perform data transmission is no less than E5, where max(d−D11, 0)≤c<d<C;

9) determining that the LBT mechanism needs to be performed, if the UE only performs a single transmission on the selected set of resources, where $R_{k,c}$ represents the resource in the selected set of resources, k=0, 1, . . . , K−1, c=0, 1, . . . , C−1, K is a number of times one piece of data is transmitted in a period, C is a number of periods for reserving the resource, and D5, D6, D7, D8, D9, D10, D11 and E2, E3, E4, E5 are threshold values.

In an exemplary embodiment, if the determination unit determines that the LBT mechanism needs to be performed, it determines that one of the selected resources is not occupied in a case where a channel energy does not exceed an energy threshold $X_{Thresh}$, wherein the energy thresholds $X_{Thresh}$ used by the LBT mechanism are identical or different for different performing conditions.

In an exemplary embodiment, the determination unit is configured to determine whether the resource is occupied by:

deciding, if the UE does not perform data transmission on one of the selected set of resources, whether a resource subsequent to the one resource in the selected set of resources is occupied based on the detected SA, the received power and the received energy on the resource.

In an exemplary embodiment, the determination unit is configured to determine whether the resource is occupied by:

determining, if the UE does not perform data transmission on one of the selected set of resources, whether a resource subsequent to the one resource in the selected set of resources is occupied based on the detected SA, a received power and a received energy on the resource only in a case where a number of resources, among the selected set of resources, on which the UE does not perform data transmission exceeds a predetermined threshold NR1, or a number of consecutive resources, among the selected set of resources, on which the UE does not perform data transmission exceeds a predetermined threshold NR2, where NR1 and NR2 are threshold values.

In an exemplary embodiment, a threshold of the received power for the determination unit to determine whether the resource subsequent to the one resource in the selected set of resources is occupied is different from a threshold of a received power for performing resource selection; and when the received energy exceeds its threshold, the determination unit determines that the resource subsequent to the resource in the selected set of resources is occupied.

In an exemplary embodiment, the determination unit determines, if the UE does not perform data transmission on one of the selected set of resources, whether the resource subsequent to the one resource in the selected set of resources is occupied, in conjunction with the LBT operation and based on the detected SA, the received power and the received energy.

MODE FOR THE INVENTION

For the purpose of further clarifying objects, technical means and advantages of the present disclosure, embodiments of the present disclosure will be described below in detail with reference to the accompanying drawings.

In a 3GPP (3rd Generation Partnership Project) LTE (Long Term Evolution)-based V2X (Vehicle-to-X) system, a UE first transmits PSCCH (Physical Sidelink Control Channel), indicating information such as time-frequency resource occupation of a data channel, a MCS (Modulation and Coding Scheme), etc. Next, the UE transmits data on the data channel scheduled by the PSCCH. For an LTE D2D (Device-to-Device)/V2X system, the above scheduling assignment (SA) is also referred to as PSCCH, and the data channel is also referred to as PSSCH (Physical Sidelink Shared Channel). An allocation granularity of frequency resources is a sub-channel. One sub-channel includes consecutive PRBs (Physical Resource Blocks), and the number of the PRBs is configured by higher-layer signaling. Resources for a device may occupy one or more consecutive sub-channels.

For a UE, since its data are substantially periodically generated for a time period, the UE may reserve resources periodically at a certain reserved interval. Each data may be sent repeatedly K times, and correspondingly K resources need to be reserved, where K is greater than or equal to 1, so as to avoid that some devices cannot receive the data due to restrictions of a half-duplex operation. Based on the detected information in a sensing window, the UE may select K resources it can occupy, and reserve for C periods continuously. One method for resource detection is to obtain the PSSCH scheduled by the PSCCH as described above based on decoding of PSCCHs of other UEs, so that received power at the corresponding UE, such as PSSCH-RSRP (Physical Sidelink Control Channel-Reference Signal Received Power), may be measured, and thus resource occupancy and/or reservation may be decided based on the above received power and reserved intervals in the PSCCH. Another method for resource detection is to decide resource occupancy and/or reservation based on a received energy (e.g., S-RSSI (Sidelink–Received Signal Strength Indication)). For a resource on a subframe x within the selected window, the above received energy refers to an average value of received energy of the same sub-channel resources of a subframe x–$P_{rsvp}$·j within the sensing window, where $p_{rsvp}$ is the reserved interval, e.g., j is an arbitrary integer. Based on the above two detection methods, the device may avoid transmission on the same resources as those being occupied by other devices as much as possible.

FIG. 1 shows a schematic flowchart of a method for resource selection based on detection in prior art.

Assuming that the resource selection is performed on a subframe n, and a reserved interval of current reserved resources of a UE is $p_A$. The UE may select resources within a selection window [n+$T_1$, n+$T_2$] and reserve C periods consecutively at the interval $p_A$·$T_1$ and $T_2$ depend on implementations of the UE, e.g., $T_1$≤4, 20≤$T_2$≤100. $T_1$ depends on a processing delay of the UE from selecting the resources to being able to start sending scheduling allocation (SA) signaling and data, and $T_2$ mainly depends on delay characteristics tolerable to current traffic. First, all resources within the selection window are set in a set $S_A$ (101). Next, according to a correctly received SA (assuming that the SA indicates that the resources continue to be reserved after subframe n), a received power of a data channel scheduled by the SA is measured. When the received power exceeds a corresponding threshold Th1, a part of candidate resources of $S_A$ is excluded (102). Specifically, when the received power exceeds the corresponding threshold Th1, resources Y reserved after the subframe n are not available according to the SA. The above threshold Th1 is determined based on a priority of the UE that performs the resource selection in conjunction with a priority indicated by the correctly received SA as described above. Assuming that $R_{x,y}$ represents a single subframe resource within the selection window [n+$T_1$, n+$T_2$] and $R_{x,y}$ is located in subframe y and contains one or more consecutive sub-channels starting from sub-channel x, when a PRB (physical resource block) of $R_{x,y+j·P}$ overlap with a PRB of the above resource Y, $R_{x,y}$ is not available to UE A, that is, $R_{x,y}$ is excluded from the set $S_A$, where j=0, 1, . . . , C−1, and C is a number of periods for which UE A currently needs to reserve resources according to a period $p_A$. Next, it is decided whether the remaining resources of $S_A$, reaches a ratio R, e.g., 20%, of the total resources (103). If the ratio is smaller than R, the threshold Th1 is increased by 3 dB (104), and the process restarts from step 101; otherwise, the process proceeds to step 105. In step 105, the received energy of the remaining resources of $S_A$ is estimated, and the resource with the lowest received energy is moved to a set $S_B$ until a ratio of the resources of $S_B$ is R. For a resource containing multiple sub-channels, the received energy of the resource is an average value of the received energy on the respective sub-channels it contains. Next, resources for data transmission are selected (106) from the resources of $S_B$, and are used for data transmission (107). Here, when one piece of data is transmitted twice, the UE first selects a resource for data transmission from $S_B$, and then selects another resource for data transmission, in a case where a delay requirement is satisfied and there is an available resource within the range indicated by the SA.

In the LTE V2X system, for the method for resource selection based on detection, after the UE selects and reserves the resources, a number of times the UE may use the resources for data transmission is denoted as S, where S is a random number. When the number of times the UE may use the resources for data transmission reaches S, the resource selection of the UE may be triggered again. In addition, the resource selection may also be triggered in some other situations. For example, assuming that the UE fails to transmit data on N consecutive reserved resources, or fails to transmit data within a time period of a length t, the UE triggers the resource reselection.

LTE V2X only supports some basic security-related V2X services. How to further enhance V2X technology is an urgent problem to be solved.

As described previously with reference to FIG. 1, the existing LTE V2X system avoids neighboring UEs from occupying the same resources based on the two kinds of detections within the sensing window. That is, according to the detected SA of other UEs, received power (e.g., represented by PSSCH-RSRP) of the data channel scheduled by the SA is measured, and received energy (e.g., represented by S-RSSI) on one resource is detected. The premise of such a method is an assumption that the resource occupancy of the UE is periodic, so that resource occupancy situations at subsequent times may be predicted based on the detection within the sensing window. However, because of rapid movement of the UE, an interference situation between the UEs during an actual data transmission may have been changed a lot with respect to the interference measurement within the sensing window, and the above mechanism may still bring collisions of the neighboring UEs.

FIG. 2 shows a schematic diagram of resource conflicts between a plurality of UEs.

As shown in FIG. 2, if UE 1 reserves the resources 201-207 according to the interval $p_A$, assuming that UE 1 does not transmit on one or more reserved resources 203-205, it will be possible to collide with UE 2 when UE 1 intends to resume its transmission on a subsequent reserved resource 206. Here, since UE1 does not transmit on resource 203, UE 2 cannot exclude subsequent reserved resources 204-207 of UE 1 according to PSSCH-RSRP of UE1 on resource 203, so that UE 2 may occupy resources 204-207 which are conflicted with those of UE 1.

In order to avoid or at least alleviate the above disadvantages, the embodiments of the present disclosure provide a mechanism of further reducing the collisions between the UEs in resource selection and data transmission of the UEs.

Hereinafter, a method performed at a UE for data transmission according to an exemplary embodiment of the present disclosure will be described with reference to FIG. 3.

FIG. 3 shows a schematic flowchart of a method 300 for data transmission at a UE according to an exemplary embodiment of the present disclosure.

As shown in FIG. 3, the method 300 may include steps S301, S302, S303 and S304.

In step S301, the UE may detect SA for other UEs within a sensing window that includes a plurality of (e.g., 1000) TUs. Specifically, the UE may measure a received power (e.g., PSSCH-RSRP) of data channel scheduled by the SA, and detect received energy (e.g., S-RSSI) of each sub-channel of each TU.

Then in step S302, the UE may select the resources for data transmission based on the detected SA. Specifically, the UE may select the resources for data transmission based on the detected SA, the received power, and the received energy.

The TU as described above may refer to a subframe or a time slot, etc. For example, the TU in the LTE V2X system is a subframe.

In step S303, the UE may determine whether a resource in the selected set of resources is occupied, before it transmits data on the resource.

Here, the method by which the UE determines whether a resource is occupied may still be based on detecting the received power and/or the received energy, or may be based on other mechanisms, such as LBT (listen before talk), or may be based on detecting the received power and/or the received energy in conjunction with the other mechanisms.

In an exemplary embodiment, the step S303 of determining whether the resource in the selected set of resources is occupied may include steps as follows:

determining, according to a predetermined condition, whether a LBT mechanism needs to be performed within a predetermined time period T; and determining that the resource is not occupied, if it is determined that the LBT mechanism does not need to be performed; otherwise, determining whether the resource is occupied by performing the LBT mechanism, if it is determined that the LBT mechanism needs to be performed. The way of how to determine whether the LBT mechanism needs to be performed will be detailed later.

In an exemplary embodiment, if it is determined that the LBT mechanism needs to be performed, the predetermined time period T for performing the LBT mechanism may be obtained by following ways: the UE that needs to perform the LBT mechanism shortening a time period by a length T from a beginning of the TU, or the UE that does not need to perform the LBT mechanism transmitting, before the TU, a padding signal for a time period having a length of T, which will be described in detail later in conjunction with FIG. 4 and FIG. 5.

In step S304, if the UE determines that the resource is not occupied, the data may be transmitted on the resource in the selected set of resources.

Hereinafter, the process of resource selection and data transmission provided by the present disclosure will be described in detail through two exemplary embodiments.

In a sidelink system, in order to avoid a signal of the sidelink system being overlapped with a signal of a cellular network and generate transmission and reception switching time between two adjacent TUs etc., the last part of a TU of the sidelink system is a period of idle time (GAP). Assuming that timings at which respective UEs transmit signals are aligned, the GAPs of the TUs of the respective UEs are also aligned. That is, different UEs generally start their transmissions at the same time and end their transmission at the same time.

In order to avoid a plurality of UEs colliding at time t, a UE may detect the channel before time t, and the UE can transmit at time t only when a condition of the channel being idle is satisfied. Such an operation is also referred to as LBT. For example, the UE detects a channel energy E within a predetermined time period T before time t, and when E is less than a predetermined threshold $X_{Thresh}$, the UE may occupy the channel for transmission. Since a common GAP follows a TU in the sidelink system, and all UEs do not transmit within the GAP, i.e., one UE cannot detect signals of other UEs in the GAP, the GAP is not suitable for the LBT. In order to avoid collisions between the UEs by means of LBT, it is required that some of the UEs transmit in a time period (e.g., the time period with a length T as described above), while others perform the LBT.

FIG. 4 schematically shows a schematic structure diagram of a TU according to an exemplary embodiment of the present disclosure.

As shown in FIG. 4, TU 400 starts with an AGC (Automatic Gain Control) period 401 and ends with a GAP period 402. The structure (a) in FIG. 4 is for a UE that does not perform LBT, and the structure (b) in FIG. 4 is for a UE that needs to perform LBT. In (b) of FIG. 4, a period 404 with a length T from the beginning of the TU is used for LBT, that is, the AGC period is shortened by the length T 404; while in (a) of FIG. 4, a period 403 with the length T is used for transmitting an AGC signal. With (b) of FIG. 4, the UE may detect signals transmitted by other UEs that do not perform the LBT within the period 404 with the length T. When it is detected that the signal strength transmitted by the other UEs exceeds a threshold, the channel is considered to be busy and the UE cannot perform data transmission.

FIG. 5 schematically shows a schematic structure diagram of a TU according to another exemplary embodiment of the present disclosure.

As shown in FIG. 5, TU 500 starts with an AGC period 501 and ends with a GAP period 502. The structure (a) in FIG. 5 is for a UE that does not perform LBT, and the structure (b) in FIG. 5 is for a UE that needs to perform LBT. In (a) of FIG. 5, a padding signal R 503 with a length T is transmitted before the TU, i.e., the UE transmits the padding signal R 503 with the length T before the AGC period. The padding signal has an effect of occupying the channel. In (b) of FIG. 5, the UE does not transmit a padding signal for a period 504 with the length T. For example, the padding signal R may be a further extension of a CP (Cyclic Prefix) of the AGC period, and the padding signal R and the CP may be a longer CP consisting of an AGC symbol. The present disclosure is not limited to any methods of transmitting the padding signal. With (b) of FIG. 5, the UE may detect signals transmitted by other UEs that do not perform the LBT within the period with the length T. When it is detected that the signal strength transmitted by the other UEs exceeds a predetermined threshold, the channel is considered to be busy and the UE cannot perform data transmission.

In order to avoid the neighboring UEs occupying the same resources, the resource selection may be performed based on the following two kinds of detections within the sensing window as described above: measuring the PSSCH-RSRP of the data channel scheduled by the SA according to the detected SA of the other UEs, and detecting the S-RSSI on one resource. Based on the above two kinds of detections, the collision may be further avoided by the LBT mechanism. Both of the above two kinds of detections are to predict the resource occupancy situations for a certain time period based on the detection within the sensing window, and have limited abilities of responding to the rapid interference variation between the UEs; while the LBT only refers to a channel busy/idle state before actual data transmission, and thus may reflect the rapid interference variation. Therefore, after the UE selects the set of resources for data transmission based on the detected SA, PSSCH-RSRP and S-RSSI, and before data transmission on the resource in the selected set of resources, the LBT mechanism may be introduced to further determine whether the resource is occupied. That is, in combination of the above two kinds of detections and the LBT, a better collision avoidance effect may be achieved.

Assuming that $R_{k,c}$ represents the resource in the set of resources selected after e.g., the UE performs the resource selection based on the above two kinds of detections (PSSCH-RSRP and S-RSSI), where K-0, 1, . . . , K-1, c-0, 1, . . . , C-1, K is the number of times one piece of data is transmitted in a period, C is the number of periods for reserving the resources, c=0 represents the resource in the set of resources selected by the resource selection, and c>0 represents the resource reserved in a certain period.

Hereinafter, a method of determining whether the UE needs to perform LBT according to an exemplary embodiment of the present disclosure will be described in detail with reference to FIG. 6.

FIG. 6 shows a schematic flowchart of a method 600 of determining whether LBT needs to be performed according to an embodiment of the present disclosure.

It may be understood that the method 600 of FIG. 6 is a part of step S303 in the method 300 of FIG. 3.

As shown in FIG. 6, the method 600 may include steps S601, S602 and S603.

In step S601, the UE may determine whether it is in a particular condition. If so (S601—Yes), the method proceeds to step S602, in which the UE determines that the LBT does not need to be performed, but may directly occupy the selected or reserved resources for data transmission, e.g., using the TU structure as shown in (a) of FIG. 4 or 5; while in other cases (S601—No), the method proceeds to step S603, in which the UE determines that the LBT needs to be performed, and the UE can occupy the selected or reserved resources for data transmission only if the condition of the channel being idle is satisfied (e.g., the channel energy being no more than the energy threshold $X_{Thresh}$ as described above), e.g., using the TU structure as shown in (b) of FIG. 4 or 5, otherwise the UE does not perform data transmission.

Regarding under which conditions the UE determines that the LBT mechanism does not need to be performed when it intends to perform data transmission on which resource, there may be at least one of the following cases.

1) It is determined that the LBT mechanism does not need to be performed for data transmission on a resource $R_{k,o}$. That is, it is determined that the LBT mechanism does not need to be performed for data transmission on the first resource in the selected set of resources.

2) It is determined that the LBT mechanism does not need to be performed for data transmission on a resource $R_{k,d}$, if the UE has performed data transmission on d consecutive resources $R_{k,c}$ before the resource $R_{k,d}$, where c<d<C. That is, if the UE performs data transmission on the consecutive resources before the resource $R_{k,d}$, the LBT mechanism does not need to be performed when the UE performs data transmission on the resource $R_{k,d}$.

3) It is determined that the LBT mechanism does not need to be performed for data transmission on the resource $R_{k,d}$, if the UE has performed data transmission on D1 consecutive resources $R_{k,c}$ before the resource $R_{k,d}$, where d−D1≤c<d and D1≤d<C. That is, if the UE performs data transmission on the D1 (i.e., in the case of and D1≤d<C) consecutive resources before the resource $R_{k,d}$, the LBT mechanism does not need to be performed for data transmission on the resource $R_{k,d}$, where D1 is the first threshold, which may be configured, pre-configured or predefined by a base station, e.g., D1=1.

4) It is determined that the LBT mechanism does not need to be performed for data transmission on the resource $R_{k,d}$, if the UE has performed data transmission on min(D2, d) consecutive resources $R_{k,c}$ before the resource $R_{k,d}$, where max(d−D2,0)≤c<c. That is, if the UE performs data transmission on the D2 (i.e., in the case of max(d−D2,0) ≤c<d<C and D2≤d) or d (i.e., in the case of max(d−D2,0) ≤c<d<C and D2>d) consecutive resources before the resource $R_{k,d}$, the LBT mechanism does not need to be performed for data transmission on the resource $R_{k,d}$.

5) It is determined that the LBT mechanism does not need to be performed for data transmission on the resource $R_{k,d}$, if a number of resources $R_{k,c}$, among D3 consecutive resources $R_{k,c}$, before the resource $R_{k,d}$, on which the UE performs data transmission is no less than E1, where d−D3≤c<d and D3≤d<C. That is, if the UE performs data transmission on at least E1 resources of the D3 (i.e., in the case of d−D3≤c<d and D3≤d<C) consecutive resources before the resource $R_{k,d}$, the LBT mechanism does not need to be performed for data transmission on the resource $R_{k,d}$.

6) It is determined that the LBT mechanism does not need to be performed for data transmission on the resource $R_{k,d}$, if a number of resources $R_{k,c}$, among min(D4, d) consecutive resources $R_{k,c}$ before the resource $R_{k,d}$, on which the UE performs data transmission is no less than E1, where max (d—D4,0)≤c<d<C. That is, if the UE performs data transmission on at least E1 resources of the D4 (i.e., in the case of max(d−D4,0)≤c<d<C and D4≤d) or d (i.e., in the case of max(d−D4,0)≤c<d<C and D4≤d) consecutive resources before the resource $R_{k,d}$, the LBT mechanism does not need to be performed for data transmission on the resource $R_{k,d}$.

7) It is determined that the LBT mechanism does not need to be performed, if the UE only performs a single transmission on the set of resources selected according to the two kinds of detections and does not perform resource reservation.

Here, D1, D2, D3, D4 and E1 are threshold values, which may be configured, pre-configured or predefined by the base station, e.g., may be equal to 1.

Values of D1, D2, D3, and D4 may depend on the number of resources $R_{k,c}$, c<d on which the UE does not perform data transmission. The larger the number is, the higher the probability of collision with other UEs could be. Therefore, the values of D1, D2, D3, and D4 are needed to be larger.

The values of D1, D2, D3 and D4 may depend on a congestion level of the channel. The higher the congestion level is, the larger the number of UEs for transmission is. The values of D1, D2, D3 and D4 may be larger, so as to reduce the collision as much as possible.

Hereinafter, a method of determining whether the UE needs to perform LBT according to another exemplary embodiment of the present disclosure will be described in detail with reference to FIG. 7.

FIG. 7 shows a schematic flowchart of a method 700 of determining whether LBT needs to be performed according to an embodiment of the present disclosure.

It may be understood that the method 700 of FIG. 7 is a part of step S303 in the method 300 of FIG. 3.

As shown in FIG. 7, the method 700 may include steps S701, S702 and S703.

In step S701, the UE may determine whether it is in a particular condition. If so (S601—Yes), the method proceeds with step S702, in which the UE determines that the LBT needs to be performed, and the UE can occupy the selected or reserved resources for data transmission only if the condition of the channel being idle is satisfied (e.g., the channel energy being no more than the energy threshold $X_{Thresh}$ as described above), e.g., using the TU structure as shown in (b) of FIG. 4 or 5, otherwise the UE does not perform data transmission; while in other cases (S701—No), the method proceeds with step S703, in which the UE determines that the LBT does not need to be performed, but may directly occupy the selected or reserved resources for data transmission, e.g., using the TU structure as shown in (a) of FIG. 4 or 5.

Regarding under which conditions the UE determines that the LBT mechanism needs to be performed when it intends to perform data transmission on which resource, there may be at least one of the following cases.

1) It is determined that the LBT mechanism needs to be performed for data transmission on a resource $R_{k,o}$. That is, it is determined that the LBT mechanism needs to be performed for data transmission on the first resource in the selected set of resources.

2) It is determined that the LBT mechanism needs to be performed for data transmission on first D5 consecutive resources $R_{k,c}$ where c<D5.

3) It is determined that the LBT mechanism needs to be performed for data transmission on the resource $R_{k,d}$, if the UE does not perform data transmission on at least one of D6 consecutive resources $R_{k,c}$ before the resource $R_{k,d}$, where d−D6≤c<d and D6≤d<C. That is, if the UE does not perform data transmission on at least one of the D6 (i.e., in the case of d−D2≤c<d and D6≤d<C) consecutive resources before the resource $R_{k,d}$, it is determined that the LBT mechanism needs to be performed for data transmission on the resource $R_{k,d}$.

4) It is determined that the LBT mechanism needs to be performed for data transmission on the resource $R_{k,d}$, if the UE does not perform data transmission on at least one of min(D7, d) consecutive resources $R_{k,c}$ before the resource $R_{k,d}$, where max(d−D7,0)≤c<d<C. That is, if the UE does not perform data transmission on at least one of the D7 (i.e., in the case of max(d−D7,0)≤c<c<C and D7≤d) or d (i.e., in the case of max(d−D7,0)≤c<d<C and D7>d) consecutive resources before the resource $R_{k,d}$, it is determined that the LBT mechanism needs to be performed for data transmission on the resource $R_{k,d}$.

5) It is determined that the LBT mechanism needs to be performed for data transmission on the resource $R_{k,d}$, if a number of resources $R_{k,c}$, among D8 consecutive resources $R_{k,c}$, before the resource $R_{k,d}$, on which the UE does not perform data transmission is no less than 1 and a number of resources $R_{k,c}$, among d consecutive resources $R_{k,c}$ before the resource $R_{k,d}$, on which the UE does not perform data transmission is no less than E2, where d−D8≤c<d and D8≤c<d<C. That is, if the number of resources $R_{k,c}$, among D8 (i.e., in the case of d−D8≤c<d and D8≤d<C) consecutive resources $R_{k,c}$ before the resource $R_{k,d}$, on which the UE does not perform data transmission is no less than 1 and the number of resources $R_{k,c}$, among d consecutive resources $R_{k,c}$ before the resource $R_{k,d}$, on which the UE does not perform data transmission is no less than E2, it is determined that the LBT mechanism needs to be performed for data transmission on the resource $R_{k,d}$.

6) It is determined that the LBT mechanism needs to be performed for data transmission on the resource $R_{k,d}$, if a number of resources $R_{k,c}$, among min(D9, d) consecutive resources $R_{k,c}$ before the resource $R_{k,d}$, on which the UE does not perform data transmission is no less than 1 and a number of resources $R_{k,c}$, among d consecutive resources $R_{k,c}$ before the resource $R_{k,d}$, on which the UE does not perform data transmission is no less than E3, wherein max(d−D9,0)≤c<d<C. That is, if the number of resources $R_{k,c}$, among D9 (i.e., in the case of max(d−D9,0)≤c<d<C and D9≤d) or d (i.e., in the case of max(d−D9,0)≤c<d<C and D9>d) consecutive resources $R_{k,c}$, before the resource $R_{k,d}$, on which the UE does not perform data transmission is no less than 1 and the number of resources $R_{k,c}$, among d consecutive resources $R_{k,c}$ before the resource $R_{k,d}$, on which the UE does not perform data transmission is no less than E3, it is determined that the LBT mechanism needs to be performed for data transmission on the resource $R_{k,d}$.

7) It is determined that the LBT mechanism needs to be performed for data transmission on the resource $R_{k,d}$, if a number of resources $R_{k,c}$, among D10 consecutive resources $R_{k,c}$ before the resource $R_{k,d}$, on which the UE does not perform data transmission is no less than E4, where d−D10≤c<d and D10≤d<C. That is, if the number of resources $R_{k,c}$, among D10 (i.e., the case of d−D10≤c<d and D10≤d<c) consecutive resources $R_{k,c}$ before the resource $R_{k,d}$, on which the UE does not perform data transmission is no less than E4, it is determined that the LBT mechanism needs to be performed for data transmission on the resource $R_{k,d}$.

8) It is determined that the LBT mechanism needs to be performed for data transmission on the resource $R_{k,d}$, if a number of resources $R_{k,c}$, among min (D11, d) consecutive resources $R_{k,c}$ before the resource $R_{k,d}$, on which the UE does not perform data transmission is no less than E5, where max (d−D11, 0)≤c<d<C. That is, if the number of resources $R_{k,c}$, among D11 (i.e., the case of max(d−D11, 0)≤c<d<C and D11≤d) or d (i.e., the case of max(d−D11, 0)≤c<d<C and D11>d) consecutive resources $R_{k,c}$ before the resource $R_{k,d}$, on which the UE does not perform data transmission is no less than E5, it is determined that the LBT mechanism needs to be performed for data transmission on the resource $R_{k,d}$.

9) It is determined that the LBT mechanism needs to be performed, if the UE only performs a single transmission on the set of resources selected according to the two kinds of detections and does not perform resource reservation.

Here, D5, D6, D7, D8, D9, D10, D11 and E2, E3, E4, E5 are threshold values, which may be configured, pre-configured or predefined by the base station, e.g., may be equal to 1.

Values of D5, D6, D7, D8, D9, D10 and D11 may depend on the number of resources $R_{k,c}$ c<d on which the UE does not perform data transmission. The larger the number is, the higher the probability of collision with other UEs could be. Therefore, the values of D5, D6, D7, D8, D9, D10 and D11 are needed to be larger.

The values of D5, D6, D7, D8, D9, D10 and D11 may depend on a congestion level of the channel. The higher the congestion level is, the larger the number of UEs for transmission is. The values of D5, D6, D7, D8, D9, D10 and D11 may be larger, so as to reduce the collision as much as possible.

When determining whether the UE needs to perform the LBT, if it is determined that the LBT mechanism needs to be performed, it is determined that one of the selected resources is not occupied in a case where the channel energy does not exceed the energy threshold $X_{Thresh}$ Corresponding to the above different situations, the energy thresholds $X_{Thresh}$ used by the UE in performing the LBT may be identical or different. For example, the thresholds corresponding to the above different situations may be configured, pre-configured, or predefined by the base station. With the above method, when the UE cannot perform data transmission, the UE may trigger resource selection.

The method of performing the LBT involved in the above two exemplary embodiments may process the resources $R_{k,c}$, l=0, 1, . . . , K−1 as a whole. The LBT may be performed on all K resources of the resources $R_{k,c}$, or the LBT may be performed on neither of the K resources of the resources $R_{k,c}$; or the LBT may be performed only on the first resource of K resources of the resources $R_{k,c}$. When the LBT is successful, it is considered that the LBT does not need to be performed again on the other (K−1) resources of the resources $R_{k,c}$, and data transmission may be performed directly. In the above case, for resources $R_{k,c}$, it may be considered that the UE has performed data transmission on the resources $R_{k,c}$ only if the data transmission has been performed on all K resources of the resources $R_{k,c}$; or it may be considered that the UE has performed data transmission on the resources $R_{k,c}$ as long as the data transmission has been performed on one of the K resources of the resources $R_{k,c}$; or it may be considered that the UE has performed data transmission on the resources $R_{k,c}$ only if the number resources, among the K resources of the resources $R_{k,c}$, on which the UE actually performs the data transmission is no less than a threshold Tk. Tk may be configured, pre-configured or predefined by the base station, e.g., Tk=1.

The above two methods for processing the LBT may also be applied individually to each of the K resources of the resources $R_{k,c}$ for processing. In the above case, it may be decided individually for each of the K resources of $P_{k,c}$, k=0, 1, . . . , K−1 whether the data transmission has been performed. For the resources $R_{k,d}$(k=j), it may be decided according to the data transmission situation on $R_{k,c}$(k=j,c=0, 1, . . . , C−1) whether the LBT is to be performed on the resource $R_{k,d}$(k=j).

As described above, in the sidelink system, in order to avoid the signal of the sidelink system being overlapped with the signal of the cellular network, the resource selection may be processed based on the two kinds of detections as follows within the sensing window, i.e., measuring the PSSCH-RSRP of the data channel scheduled by the detected SA of other UEs, and detecting the S-RSSI of one resource. The premise of such a method is an assumption that the resource occupancy of the UE is periodic, so that resource occupancy situations at subsequent times may be predicted based on the detection within the sensing window. However, as shown in FIG. 2, if the UE does not perform data transmission on one or more reserved resources after the resource selection, it will be possible to collide with other UEs when the UE intends to resume its transmission on a subsequent reserved resource.

Assuming that $R_{k,c}$ represents the resource in the set of resources selected after e.g., the UE performs the resource selection based on the above two kinds of detections (PSSCH-RSRP and S-RSSI), where k=0, 1, . . . , K−1, c=0, 1, . . . , C−1, K is the number of times one piece of data is transmitted in a period, C is the number of periods for reserving the resource, c=0 represents the resource in the set of resources selected by the resource selection, and c>0 represents the resource reserved in a certain period.

When the UE performs data transmission on the resources in the selected set of resources in step S303 of the method 300, if the UE does not perform data transmission on one of the resources $R_{k,m}$, the UE may perform detection on the resources $R_{k,m}$, including measuring PSSCH-RSRP and/or S-RSSI of other UEs, so as to decide whether the resources subsequent to the resources $R_{k,m}$ are occupied by the other UEs. Alternatively, the UE may also perform detection on the TU where the resources $R_{k,m}$ are located, including measuring PSSCH-RSRP and/or S-RSSI of other UEs, so as to decide whether the resources subsequent to the resources $R_{k,m}$ occupied by the other UEs. In addition, the UE may perform detection on other TUs than the TU where the resources $R_{k,m}$ are located, including measuring PSSCH-RSRP and/or S-RSSI of other UEs, which may also be used to decide whether the resources subsequent to the resources $R_{k,m}$ are occupied by the other UEs.

The UE may decide whether the resources subsequent to the resources $R_{k,m}$ are occupied by the other UEs according to the PSSCH-RSRP and a threshold Th2 of the PSSCH-RSRP. The threshold Th2 may be different from the threshold Th1 of the PSSCH-RSRP when the resource selection is performed, e.g., Th2>Th1. Since the UE has already reserved the resources $R_{k,m}$ by means of resource selection, the threshold Th2 for re-confirming that the resources are available may be relatively relaxed. The above threshold Th2 may also be related to the number of resources $R_{k,m}$ on which the UE does not perform the data transmission. The above threshold Th2 may also be related to the number of consecutive resources $R_{k,m}$ on which the UE does not perform the data transmission. For example, the larger the above number is, the lower Th2 may be, so that the operation of re-confirming whether the resources are available is stricter. When it is decided based on S-RSSI whether the resources subsequent to the resources $R_{k,m}$ are occupied by the other UEs, a threshold Th for S-RSSI may be introduced, that is, the resources are considered unavailable when S-RSSI>Th. The threshold Th may be related to the number of resources on which the UE does not perform data transmission. The above threshold Th may also be related to the number of consecutive resources on which the UE does not perform data transmission. For example, the larger the number is, the lower Th may be, so that the operation of reconfirming whether the resources are available is stricter.

Hereinafter, a method of determining whether a resource is occupied according to an exemplary embodiment of the present disclosure will be described in detail with reference to FIG. 8.

FIG. 8 shows a schematic flowchart of a method 800 of determining whether a resource is occupied according to an embodiment of the present disclosure.

It may be understood that the method 700 of FIG. 8 is a part of step S303 in the method 300 of FIG. 3.

As shown in FIG. 8, the method 800 may include steps S801, S802 and S803.

In an implementation, in step S801, The UE performs the above detections of

PSSCH-RSRP and/or S-RSSI on at least the resources $R_{k,m}$, on which data transmission is not performed, and decides whether the resources subsequent to the resources $R_{k,m}$ are occupied by other UEs. If they are occupied by the other UEs (S801—Yes), the method proceeds to step S802, in which the UE cannot occupy the reserved resources subsequent to the resources $R_{k,m}$; otherwise (S801—No), the method proceeds to step S803, in which the UE may perform the data transmission on the reserved resources subsequent to the resources $R_{k,m}$. When the UE cannot occupy the reserved resources subsequent to the resources $R_{k,m}$, the UE may re-perform the resource selection.

In another embodiment, step S801 may be performed only when the number of resources $R_{k,m}$, on which the UE does not perform data transmission is more than a specific threshold NR1, or the number of consecutive resources $R_{k,m}$, on which the UE does not perform data transmission is more than a specific threshold NR2, so as to decide whether the resources subsequent to the resources $R_{k,m}$ are occupied by the other UEs according to the above detections of PSSCH-RSRP and/or S-RSSI. If they are occupied by the other UEs (S801—Yes), the method proceeds to step S802, in which the UE cannot occupy the reserved resources subsequent to the resources $R_{k,m}$; otherwise (S801—No), the method proceeds to step S803, in which the UE may perform the data transmission on the reserved resources subsequent to the resources $R_{k,m}$. NR1 may be configured, pre-configured or predefined by the base station, e.g., NR1=1. NR2 may be configured, pre-configured or predefined by the base station, e.g., NR2=1. When the UE cannot occupy the reserved resources subsequent to the resources $R_{k,m}$, the UE may re-perform the resource selection.

According to the description of the first exemplary embodiment, the collisions between the UEs may be avoided by the LBT mechanism, when the UE does not perform data transmission on one or more resources $R_{k,c}$, k=0, 1, . . . , K−1, c−0, 1, . . . , C−1. Such a LBT mechanism and the method based on the above two kinds of detections of PSSCH-RSRP and S-RSSI in this embodiment may also work together.

Hereinafter, a method of determining whether a resource is occupied by a combination of the LBT mechanism and the above two kinds of detections of PSSCH-RSRP and S-RSSI as described above according to an exemplary embodiment of the present disclosure will be described in detail with reference to FIG. 9.

FIG. 9 shows a schematic flowchart of a method of determining whether a resource is occupied according to another embodiment of the present disclosure.

As shown in FIG. 9, the method 900 may include steps S901, S902 and S903.

In step S901, the UE may decide whether the resources subsequent to the resources $R_{k,m}$ are occupied by other UEs by combining the LBT operation in the first exemplary embodiment and one of the above two implementations of the method in the present embodiment. If it is decided, based on at least one of the LBT operation of the above first exemplary embodiment and the method in the present embodiment, that the reserved resources subsequent to the resources $R_{k,m}$ are used by other UEs (S901—Yes), the method proceeds to step S902, in which the UE cannot occupy the reserved resources subsequent to the resources $R_{k,m}$; otherwise (S901—No), the method proceeds to step S903, in which the UE may perform data transmission on the reserved resources subsequent to the resources $R_{k,m}$. When the UE cannot occupy the reserved resources subsequent to the resources $R_{k,m}$, the UE may re-perform the resource selection.

The above method may process the resources $R_{k,c}$, k=0, 1, . . . , K−1 as a whole.

When one of K resources of the resources $R_{k,c}$ is occupied by other UEs, the UE cannot occupy all K resources of the resources $R_{k,c}$. Alternatively, the above method may be applied individually to each of the K resources of the resources $R_{k,c}$ for processing. In the above conditions, it may be decided individually for each of the K resources of $R_{k,c}$, k=0, 1, . . . , K−1 whether it is occupied by other UEs. When a part of the K resources of $R_{k,c}$, l=0, 1, . . . , K−1 is not occupied by other UEs, the UE may use this part of unoccupied resources for data transmission.

Hereinafter, a schematic structure diagram of a UE according to an exemplary embodiment of the present disclosure will be described with reference to FIG. 10.

FIG. 10 is a schematic structure diagram of the UE 1000 according to an exemplary embodiment of the present disclosure.

The UE 1000 may be configured to perform the methods 300, 600, 700, 800 and 900 as described above with reference to FIG. 3. For the sake of brevity, only the schematic structure of the UE according to the exemplary embodiment of the present disclosure is described herein, and the details which have already been described in the methods 300, 600, 700, 800 and 900 with reference to FIG. 3 are omitted.

As shown in FIG. 10, the UE 1000 may include a detection unit 1001, a selection unit 1002, a determination unit 1003, and a transceiver 1004. It should be understood by the skilled in the art that only the detection unit 1001, the selection unit 1002, the determination unit 1003 and the transceiver 1004 related to the present disclosure are shown in the UE 1000 in FIG. 10, so as to avoid obscuring the present disclosure. However, the skilled in the art should understand that although not shown in FIG. 5, the UE according to the embodiment of the present disclosure further includes other units that may constitute the UE.

The detection unit 1001 may be configured to detect SA of other UEs within a sensing window which includes a plurality of TUs, measure a received power of a data channel scheduled by the SA, and detect received energy of each sub-channel of each TU.

The selection unit 1002 may be configured to select, based on the detected SA, the received power and the received energy, a set of resources for data transmission.

The determination unit 1003 may be configured to determine, before transmitting data on a resource in the selected set of resources, whether the resource is occupied.

The transceiver 1004 may be configured to transmit the data on the resource in the selected set of resources if the determination unit 1003 determines that the resource is not occupied.

As described previously, according to the first exemplary embodiment of the present disclosure, the determination unit 1003 is configured to determine whether the resource is occupied by: determining whether a LBT mechanism needs to be performed within a predetermined time period T; and determining that the resource is not occupied, if it is determined that the LBT mechanism does not need to be performed.

If it is determined that the LBT mechanism needs to be performed, the predetermined time period T for performing the LBT mechanism may be obtained by following ways: the UE that needs to perform the LBT mechanism shortening a time period by a length T from a beginning of the TU, or the UE that does not need to perform the LBT mechanism transmitting, before the TU, a padding signal for a time period having a length of T.

In an exemplary embodiment, the determination unit 1003 can be configured to determine whether the LBT mechanism needs to be performed within the predetermined time period T by at least one of:

1) determining that the LBT mechanism does not need to be performed for data transmission on a resource $R_{k,o}$;

2) determining that the LBT mechanism does not need to be performed for data transmission on a resource $R_{k,d}$, if the UE has performed data transmission on d consecutive resources $R_{k,c}$ before the resource $R_{k,d}$, where c<d<C;

3) determining that the LBT mechanism does not need to be performed for data transmission on the resource $R_{k,d}$, if the UE has performed data transmission on D1 consecutive resources $R_{k,c}$ before the resource $R_{k,d}$, where d−D1≤c<d and D1≤d<C;

4) determining that the LBT mechanism does not need to be performed for data transmission on the resource $R_{k,d}$, if the UE has performed data transmission on min(D2, d) consecutive resources $R_{k,c}$ before the resource $R_{k,d}$, where max(d−D2,0)≤c<d<C;

5) determining that the LBT mechanism does not need to be performed for data transmission on the resource $R_{k,d}$, if a number of resources $R_{k,c}$ among D3 consecutive resources $R_{k,c}$, before the resource $R_{k,d}$, on which the UE performs data transmission is no less than E1, where d−D3≤c<d and D3≤d<C;

6) determining that the LBT mechanism does not need to be performed for data transmission on the resource $R_{k,d}$, if a number of resources $R_{k,c}$, among min(D4, d) consecutive resources $R_{k,c}$ before the resource $R_{k,d}$, on which the UE performs data transmission is no less than E1, where max(d−D4, 0)≤c<d<C;

7) determining that the LBT mechanism does not need to be performed, if the UE only performs a single transmission on the selected set of resources, where $R_{k,c}$ represents the resource in the selected set of resources, k=0, 1, . . . , K−1, C=0, 1, . . . , C−1, K is a number of times one piece of data is transmitted in a period, C is a number of periods for reserving the resource, and D1, D2, D3, D4 and E1 are threshold values.

In an exemplary embodiment, the determination unit 1003 can be configured to determine whether the LBT mechanism needs to be performed within the predetermined time period T by at least one of:

1) determining that the LBT mechanism needs to be performed for data transmission on a resource $R_{k,o}$;

2) determining that the LBT mechanism needs to be performed for data transmission on first D5 consecutive resources $R_{k,c}$ where c<D5;

3) determining that the LBT mechanism needs to be performed for data transmission on the resource $R_{k,d}$, if the UE does not perform data transmission on at least one of D6 consecutive resources $R_{k,c}$ before the resource $R_{k,d}$, where d−D6≤c<d and D6≤d<C;

4) determining that the LBT mechanism needs to be performed for data transmission on the resource $R_{k,d}$, if the UE does not perform data transmission on at least one of min(D7, d) consecutive resources $R_{k,c}$ before the resource $R_{k,d}$, where max(d−D7,0)≤c<d<C;

5) determining that the LBT mechanism needs to be performed for data transmission on the resource $R_{k,d}$, if a number of resources $R_{k,c}$, among D8 consecutive resources $R_{k,c}$, before the resource R on which the UE does not perform data transmission is no less than 1 and a number of resources $R_{k,c}$, among d consecutive resources $R_{k,c}$ before the resource $R_{k,d}$, on which the UE does not perform data transmission is no less than E2, where d−D8≤c<d and D8≤d<C;

6) determining that the LBT mechanism needs to be performed for data transmission on the resource $R_{k,d}$, if a number of resources $R_{k,c}$, among min(D9, d) consecutive resources $R_{k,c}$ before the resource $R_{k,d}$, on which the UE does not perform data transmission is no less than 1 and a number of resources $R_{k,c}$, among d consecutive resources $R_{k,c}$ before the resource $R_{k,d}$, on which the UE does not perform data transmission is no less than E3, wherein max(d−D9,0)≤c<d<C;

7) determining that the LBT mechanism needs to be performed for data transmission on the resource $R_{k,d}$, if a number of resources $R_{k,c}$, among D10 consecutive resources $R_{k,c}$ before the resource $R_{k,d}$, on which the UE does not perform data transmission is no less than E4, where d−D10≤c<d and D10≤d<C;

8) determining that the LBT mechanism needs to be performed for data transmission on the resource $R_{k,d}$, if a number of resources $R_{k,c}$, among min(D11, d) consecutive resources $R_{k,c}$ before the resource $R_{k,d}$, on which the UE does not perform data transmission is no less than E5, where max(d−D11, 0)≤c<d<C;

9) determining that the LBT mechanism needs to be performed, if the UE only performs a single transmission on the selected set of resources, wherein $R_{k,c}$ represents the resource in the selected set of resources, k=0, 1, . . . , K−1, c=0, 1, . . . , C−1, K is a number of times one piece of data is transmitted in a period, C is a number of periods for reserving the resource, and D5, D6, D7, D8, D9, D10, D11 and E2, E3, E4, E5 are threshold values.

If the determination unit 1003 determines that the LBT mechanism needs to be performed, it determines that one of the selected resources is not occupied in a case where a channel energy does not exceed an energy threshold $X_{Thresh}$, wherein the energy thresholds $X_{Thresh}$ used by the LBT mechanism are identical or different for different performing conditions.

As described above, according to the second exemplary embodiment, the determination unit 1003 can be configured to determine whether the resource is occupied by:

determining, if the UE does not perform data transmission on one of the selected set of resources, whether a resource subsequent to the one resource in the selected set of resources is occupied based on the detected SA, the received power and the received energy on the resource.

In another implementation, if the UE does not perform data transmission on one of the selected set of resources, it is determined whether a resource subsequent to the one resource in the selected set of resources is occupied based on the detected SA, the received power and the received energy on the resource only in a case where a number of resources, among the selected set of resources, on which the UE does not perform data transmission exceeds a predetermined threshold NR1, or a number of consecutive resources, among the selected set of resources, on which the UE does not perform data transmission exceeds a predetermined threshold NR2, where NR1 and NR2 are threshold values.

It should be understood that a threshold of the received power for the determination unit 1003 to determine whether the resource subsequent to the one resource in the selected set of resources is occupied is different from a threshold of a received power for performing resource selection.

When the received energy exceeds its threshold, the determination unit 1003 determines that the resource subsequent to the resource in the selected set of resources is occupied.

In yet another implementation, if the UE does not perform data transmission on one of the selected set of resources, the determination unit 1003 may determine whether the resource subsequent to the one resource in the selected set of resources is occupied, in conjunction with the LBT operation and based on the detected SA, the received power and the received energy.

FIG. 11 is a schematic structure diagram of a UE according to another exemplary embodiment of the present disclosure.

Referring to the FIG. 11, the device 1100 may include a processor 1110, a transceiver 1120 and a memory 1130. However, all of the illustrated components are not essential. The device 1100 may be implemented by more or less components than those illustrated in FIG. 11. In addition, the processor 1110 and the transceiver 1120 and the memory 1130 may be implemented as a single chip according to another embodiment.

The aforementioned components will now be described in detail.

The processor 1110 may include one or more processors or other processing devices that control the proposed function, process, and/or method. Operation of the device 1100 may be implemented by the processor 1110.

The processor 1110 may detect a scheduling assignment (SA) for other UEs within a sensing window which includes a plurality of time units(TUs), select, based on the detected SA, a set of resources for data transmission, determine before transmitting data on a resource in the selected set of resources, whether the resource is occupied and transmit the data on the resource in the selected set of resources if it is determined that the resource is not occupied.

The transceiver 1120 may include a RF transmitter for up-converting and amplifying a transmitted signal, and a RF receiver for down-converting a frequency of a received signal. However, according to another embodiment, the transceiver 1120 may be implemented by more or less components than those illustrated in components.

The transceiver 1120 may be connected to the processor 1110 and transmit and/or receive a signal. The signal may include control information and data. In addition, the transceiver 1120 may receive the signal through a wireless channel and output the signal to the processor 1110. The transceiver 1120 may transmit a signal output from the processor 1110 through the wireless channel.

The memory 1130 may store the control information or the data included in a signal obtained by the device 1100. The memory 1130 may be connected to the processor 1110 and store at least one instruction or a protocol or a parameter for the proposed function, process, and/or method. The memory 1130 may include read-only memory (ROM) and/or random access memory (RAM) and/or hard disk and/or CD-ROM and/or DVD and/or other storage devices.

The programs running on the device according to the present disclosure may be programs that enable the computer to implement functions of the embodiments of the present disclosure by controlling a central processing unit (CPU). The programs or information processed by the programs may be temporarily stored in a volatile memory, such as a random access memory (RAM), a hard disk drive (HDD), a non-volatile memory (e.g., flash memory), or other memory system.

The programs for realizing the functions of the embodiments of the present disclosure may be recorded on a computer-readable recording medium. Corresponding functions can be realized by making the computer system read the programs recorded on the recording medium and execute these programs. The so-called "computer system" herein may be a computer system embedded in the device, and may include an operating system or hardware, such as a peripheral device. The "computer-readable recording medium" may be a semi-conductor recording medium, an optical recording medium, a magnetic recording medium, a recording medium for a short-time dynamic storage program, or any other computer readable recording medium.

Various features or functional blocks of the device used in the above embodiments may be implemented or executed by circuitry (e.g., monolithic or multi-chip integrated circuits). The circuitry designed to perform the functions described in this specification may include general purpose processors, digital signal processors (DSPs), application specific integrated circuits (ASICs), field programmable gate arrays (FPGAs), or other programmable logic devices, discrete gate or transistor logic, discrete hardware components, or any combination of the above devices. The general purpose processor may be a microprocessor or any existing processor, controller, microcontroller, or state machine. The circuit may be a digital circuit or an analog circuit. One or more embodiments of the present disclosure may also be implemented using these new integrated circuit techniques in the event of a new integrated circuit technology that replaces existing integrated circuits due to advances in semiconductor technology.

As described above, the embodiments of the present disclosure have been described in detail with reference to the accompanying drawings. However, the specific structure is not limited to the above-described embodiments, and the present disclosure also includes any design modifications that do not depart from the spirit of the present disclosure. In addition, various modifications may be made to the present disclosure within the scope of the claims, and the embodiments obtained by appropriate combinations of the technical means disclosed in the different embodiments are also included within the technical scope of the present disclosure. In addition, the components having the same effects described in the above embodiments may be substituted for each other.

The foregoing descriptions are only preferred embodiments of the present disclosure and a description of the technical principles of the present disclosure. It should be understood by the skilled in the art that the scope of the present disclosure recited in this application is not limited to the particular combinations of the above technical features and should also cover other technical solutions formed by any combinations of the technical features described above or their equivalent features without departing from the inventive concept, e.g., the technical solutions formed by the above mentioned features being interchangeable with, but not limited to, technical features having similar functions as disclosed in this application.

The invention claimed is:

1. A method for data transmission, comprising:
   detecting a scheduling assignment (SA) for other UEs within a sensing window which includes a plurality of time units (TUs);
   selecting, based on the detected SA, a set of resources for data transmission;
   determining, if the UE does not perform data transmission on one of the selected set of resources, whether a resource subsequent to the one resource in the selected set of resources is occupied based on the detected SA, a received power and a received energy on the resource only in a case where a number of consecutive resources, among the selected set of resources, on which the UE does not perform data transmission exceeds a predetermined threshold NR2, before transmitting data on a resource in the selected set of resources; and
   transmitting the data on the resource in the selected set of resources if it is determined hat the resource is not occupied.

2. The method according to claim 1, wherein the determining whether the resource is occupied comprises:
   determining whether a Listen-Before-Talk (LBT) mechanism needs to be performed within a predetermined time period T; and
   determining that the resource is not occupied, if it is determined that the LBT mechanism does not need to be performed.

3. The method according to claim 2, wherein the predetermined time period T is obtained from:
   a time period having a length of T from a beginning of a TU; or
   a time period having a length of T in which a padding signal is transmitted before a TU.

4. The method according to claim 2, wherein determining whether the LBT mechanism needs to be performed within the predetermined time period T comprises at least:
- determining that the LBT mechanism does not need to be performed for data transmission on a resource $R_{k,o}$;
- determining that the LBT mechanism does not need to be performed for data transmission on a resource $R_{k,d}$, if the UE has performed data transmission on d consecutive resources before the resource $R_{k,c}$ where c<d<C;
- determining that the LBT mechanism does not need to be performed for data transmission on the resource $R_{k,d}$, if the UE has performed data transmission on D1 consecutive resources $R_{k,c}$ before the resource $R_{k,d}$ where d−D1≤c<d and D1≤d<C;
- determining that the LBT mechanism does not need to be performed for data transmission on the resource $R_{k,d}$ if the UE has performed data transmission on min(D2, d) consecutive resources $R_{k,c}$ before the resource $R_{k,d}$ where max(d−D2,0)≤c<d<C;
- determining that the LBT mechanism does not need to be performed for data transmission on the resource $R_{k,d}$, if a number of resources $R_{k,c}$, among D3 consecutive resources $R_{k,c}$ before the resource $R_{k,d}$, on which the UE performs data transmission is no less than E1, where d−D3≤c<d and D3≤d<C;
- determining that the LBT mechanism does not need to be performed for data transmission on the resource $R_{k,d}$, if a number of resources $R_{k,c}$ among min(D4, d) consecutive resources $R_{k,c}$ before the resource $R_{k,d}$, on which the UE performs data transmission is no less than E1, where max(d−D4,0)≤c<d<C;
- determining that the LBT mechanism does not need to be performed, if the UE only performs a single transmission on the selected set of resources,
- where $R_{k,c}$ represents the resource in the selected set of resources, k=0, 1, . . . , K−1 c=0, 1, . . . ,C−1, K is a number of times one piece of data is transmitted in a period, C is a number of periods for reserving the resource, and D1, D2, D3, D4 and E1 are threshold values.

5. The method according to claim 2, wherein determining whether the LBT mechanism needs to be performed within the predetermined time period T comprises at least:
- determining that the LBT mechanism needs to be performed for data transmission on a resource $R_{k,o}$;
- determining that the LBT mechanism needs to be performed for data transmission on first D5 consecutive resources $R_{k,c}$ where c<D5;
- determining that the LBT mechanism needs to be performed for data transmission on the resource $R_{k,d}$, if the UE does not perform data transmission on at least one of D6 consecutive resources $R_{k,d}$ before the resource $R_{k,d}$, where d−D6≤c<d and D6≤d<C;
- determining that the LBT mechanism needs to be performed for data transmission on the resource $R_{k,d}$, if the UE does not perform data transmission on at least one of min(D7, d) consecutive resources $R_{k,c}$ before the resource $R_{k,d}$, where max(d−D7,0)≤c<d<C;
- determining that the LBT mechanism needs to be performed for data transmission on the resource $R_{k,d}$, if a number of resources $R_{k,c}$, among D8 consecutive resources $R_{k,c}$, before the resource $R_{k,d}$, on which the UE does not perform data transmission is no less than 1 and a number of resources $R_{k,c}$ among d consecutive resources $R_{k,c}$ before the resource $R_{k,d}$ on which the UE does not perform data transmission is no less than E2, where d−D8≤c<d and D8≤d<C;
- determining that the LBT mechanism needs to be performed for data transmission on the resource $R_{k,d}$, if a number of resources $R_{k,c}$ among min(D9, d) consecutive resources $R_{k,c}$ before the resource $R_{k,d}$, on which the UE does not perform data transmission is no less than 1 and a number of resources $R_{k,c}$ among d consecutive resources $R_{k,c}$ before the resource $R_{k,d}$, on which the UE does not perform data transmission is no less than E3, where max(d−D9,0)≤c<d<C;
- determining that the LBT mechanism needs to be performed for data transmission on the resource $R_{k,d}$, if a number of resources $R_{k,c}$, among D10 consecutive resources $R_{k,c}$ before the resource $R_{k,d}$, on which the UE does not perform data transmission is no less than E4, where d−D10≤c<d and D10≤d<C;
- determining that the LBT mechanism needs to be performed for data transmission on the resource $R_{k,d}$, if a number of resources $R_{k,c}$, among min(D11, d) consecutive resources $R_{k,c}$ before the resource $R_{k,d}$, on which the UE does not perform data transmission is no less than E5, where max(d−D11,0)≤c<d<C;
- determining that the LBT mechanism needs to be performed, if the UE only performs a single transmission on the selected set of resources,
- where $R_{k,c}$ represents the resource in the selected set of resources, k=0, 1, . . . , K−1 c=0, 1, . . . , C−1, K is a number of times one piece of data is transmitted in a period, C is a number of periods for reserving the resource, and D5, D6, D7, D8, D9, D10, D11 and E2, E3, E4, E5 are threshold values.

6. The method according to claim 2, further comprising:
- determining that one of the selected resources is not occupied in a case where a channel energy does not exceed an energy threshold $X_{Thresh}$, if it is determined that the LBT mechanism needs to be performed,
- wherein the energy thresholds $X_{Thresh}$ used by the LBT mechanism are identical or different for different performing conditions.

7. The method according to claim 1, wherein determining whether the resource is occupied comprises:
- determining, if the UE does not perform data transmission on one of the selected set of resources, whether a resource subsequent to the one resource in the selected set of resources is occupied based on the detected SA, a received power and a received energy on the resource only in a case where a number of resources, among the selected set of resources, on which the UE does not perform data transmission exceeds a predetermined threshold NR1.

8. The method according to claim 1, wherein a threshold of the received power for determining whether the resource subsequent to the one resource in the selected set of resources is occupied is different from a threshold of a received power for performing resource selection; and when the received energy exceeds its threshold, it is determined that the resource subsequent to the resource in the selected set of resources is occupied.

9. The method according to claim 4, further comprising:
- determining, if the UE does not perform data transmission on one of the selected set of resources, whether the resource subsequent to the one resource in the selected set of resources is occupied, in conjunction with the LBT operation and based on the detected SA, the received power and the received energy.

10. A user equipment (UE), comprising:
a detection unit configured to detect a scheduling assignment (SA) for other UEs within a sensing window which includes a plurality of time units (TUs);
a selection unit configured to select, based on the detected SA, a set of resources for data transmission;
a determination unit configured to determine, if the UE does not perform data transmission on one of the selected set of resources, whether a resource subsequent to the one resource in the selected set of resources is occupied based on the detected SA, a received power and a received energy on the resource only in a case where a number of consecutive resources, among the selected set of resources, on which the UE does not perform data transmission exceeds a predetermined threshold NR2, before transmitting data on a resource in the selected set of resources; and
a transceiver configured to transmit the data on the resource in the selected set of resources if the determination unit determines that the resource is not occupied.

11. The UE according to claim 10, wherein the determination unit is configured to determine whether the resource is occupied by:
determining whether a Listen-Before-Talk (LBT) mechanism needs to be performed within a predetermined time period T; and
determining that the resource is not occupied, if it is determined that the LBT mechanism does not need to be performed.

12. The UE according to claim 11, wherein the predetermined time period T is obtained from:
a time period having a length of T from a beginning of a TU; or
a time period having a length of T in which a padding signal is transmitted before a TU.

13. The UE according to claim 11, wherein the determination unit is configured to determine whether the LBT mechanism needs to be performed within the predetermined time period T by at least:
determining that the LBT mechanism does not need to be performed for data transmission on a resource $R_{k,o}$;
determining that the LBT mechanism does not need to be performed for data transmission on a resource $R_{k,d}$, if the UE has performed data transmission on d consecutive resources $R_{k,c}$ before the resource $R_{k,d}$ where c<d<C;
determining that the LBT mechanism does not need to be performed for data transmission on the resource $R_{k,d}$, if the UE has performed data transmission on D1 consecutive resources $R_{k,c}$ before the resource $R_{k,d}$, where d−D1≤c<d and D1≤d<C;
determining that the LBT mechanism does not need to be performed for data transmission on the resource $R_{k,d}$, if the UE has performed data transmission on min(D2, d) consecutive resources $R_{k,c}$ before the resource $R_{k,d}$, where max(d−D2,0)≤c<d<C;
determining that the LBT mechanism does not need to be performed for data transmission on the resource $R_{k,d}$, if a number of resources $R_{k,c}$, among D3 consecutive resources $R_{k,c}$, before the resource $R_{k,d}$, on which the UE performs data transmission is no less than E1, where d−D3≤c<d and D3≤d<C;
determining that the LBT mechanism does not need to be performed for data transmission on the resource $R_{k,d}$, if a number of resources $R_{k,c}$, among min(D4, d) consecutive resources $R_{k,c}$ before the resource $R_{k,d}$, on which the UE performs data transmission is no less than E1, where max(d−D4,0)≤c<d<C;
determining that the LBT mechanism does not need to be performed, if the UE only performs a single transmission on the selected set of resources,
where $R_{k,c}$ represents the resource in the selected set of resources, k=0, 1, ..., K−1 c=0, 1, ..., C−1, K is a number of times one piece of data is transmitted in a period, C is a number of periods for reserving the resource, and D1, D2, D3, D4 and E1 are threshold values.

14. The UE according to claim 11, wherein the determination unit is configured to determine whether the LBT mechanism needs to be performed within the predetermined time period T by at least:
determining that the LBT mechanism needs to be performed for data transmission on a resource $R_{k,o}$;
determining that the LBT mechanism needs to be performed for data transmission on first D5 consecutive resources $R_{k,c}$ where c<D5;
determining that the LBT mechanism needs to be performed for data transmission on the resource $R_{k,d}$, if the UE does not perform data transmission on at least one of D6 consecutive resources $R_{k,c}$ before the resource $R_{k,d}$, where d−D6≤c<d and D6≤d<C;
determining that the LBT mechanism needs to be performed for data transmission on the resource $R_{k,d}$, if the UE does not perform data transmission on at least one of min(D7, d) consecutive resources $R_{k,c}$ before the resource $R_{k,d}$, where max(d−D7,0)≤c<d<C;
determining that the LBT mechanism needs to be performed for data transmission on the resource $R_{k,d}$, if a number of resources $R_{k,c}$, among D8 consecutive resources $R_{k,c}$, before the resource $R_{k,d}$, on which the UE does not perform data transmission is no less than 1 and a number of resources $R_{k,c}$, among d consecutive resources $R_{k,c}$ before the resource $R_{k,d}$, on which the UE does not perform data transmission is no less than E2, where d−D8≥c<d and D8≥d<C;
determining that the LBT mechanism needs to be performed for data transmission on the resource $R_{k,d}$, if a number of resources $R_{k,c}$, among min(D9, d) consecutive resources $R_{k,c}$ before the resource $R_{k,d}$, on which the UE does not perform data transmission is no less than 1 and a number of resources $R_{k,c}$, among d consecutive resources $R_{k,c}$ before the resource $R_{k,d}$, on which the UE does not perform data transmission is no less than E3, where max(d−D9,0)≤c<d<C;
determining that the LBT mechanism needs to be performed for data transmission on the resource $R_{k,d}$, if a number of resources $R_{k,c}$, among D10 consecutive resources $R_{k,c}$ before the resource $R_{k,d}$, on which the UE does not perform data transmission is no less than E4, where d−D10≤c<d and D10≤d<C;
determining that the LBT mechanism needs to be performed for data transmission on the resource $R_{k,d}$, if a number of resources $R_{k,c}$, among min(D11, d) consecutive resources $R_{k,c}$ before the resource $R_{k,d}$, on which the UE does not perform data transmission is no less than E5, where max(d−D11,0)≤c<d<C;
determining that the LBT mechanism needs to be performed, if the UE only performs a single transmission on the selected set of resources,
where $R_{k,c}$ represents the resource in the selected set of resources, k=0, 1, ..., K−1 c=0, 1, ..., C−1, K is a number of times one piece of data is transmitted in a period, C is a number of periods for reserving the resource, and D5, D6, D7, D8, D9, D10, D11 and E2, E3, E4, E5 are threshold values.

* * * * *